United States Patent
Nakazato et al.

(10) Patent No.: US 9,175,824 B2
(45) Date of Patent: Nov. 3, 2015

(54) VEHICLE HEADLAMP

(75) Inventors: Yoshiaki Nakazato, Tokyo (JP); Yoshiaki Nakaya, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 19 days.

(21) Appl. No.: 14/119,824

(22) PCT Filed: May 22, 2012

(86) PCT No.: PCT/JP2012/062988
§ 371 (c)(1),
(2), (4) Date: Nov. 22, 2013

(87) PCT Pub. No.: WO2012/161170
PCT Pub. Date: Nov. 29, 2012

(65) Prior Publication Data
US 2014/0112012 A1  Apr. 24, 2014

(30) Foreign Application Priority Data
May 24, 2011  (JP) ................... 2011-115977

(51) Int. Cl.
*F21S 8/10* (2006.01)

(52) U.S. Cl.
CPC ............. *F21S 48/12* (2013.01); *F21S 48/1159* (2013.01); *F21S 48/1388* (2013.01)

(58) Field of Classification Search
CPC .... F21S 48/1159; F21S 48/12; F21S 48/1138
USPC ................. 362/510, 509, 543, 545, 228, 259
See application file for complete search history.

(56) References Cited

U.S. PATENT DOCUMENTS

| | | | |
|---|---|---|---|
| 7,500,773 B2* | 3/2009 | Komatsu | 362/545 |
| 8,439,537 B2* | 5/2013 | Nakazato et al. | 362/510 |
| 2004/0257827 A1 | 12/2004 | Ishida et al. | |
| 2005/0231971 A1 | 10/2005 | Ishida | |
| 2011/0084609 A1 | 4/2011 | Kawaguchi et al. | |

FOREIGN PATENT DOCUMENTS

| | | |
|---|---|---|
| JP | 2005-11761 A | 1/2005 |
| JP | 2005-294166 A | 10/2005 |
| JP | 4365253 B2 | 8/2009 |
| JP | 2010-92747 A | 4/2010 |
| JP | 2010-232044 A | 10/2010 |
| JP | 2011-86432 A | 4/2011 |

OTHER PUBLICATIONS

Japanese Office Action for the related Japanese Patent Application No. 2011-115977 dated Feb. 5, 2015.
International Search Report and Written Opinion of the International Search Report for PCT/JP2012/062988 dated Aug. 28, 2012.
International Preliminary Report on Patentability for PCT Patent App. No. PCT/JP2012/062988 (Dec. 5, 2013) with English language translation thereof.

* cited by examiner

*Primary Examiner* — Anabel Ton
(74) *Attorney, Agent, or Firm* — Kenealy Vaidya LLP

(57) ABSTRACT

There is provided a vehicle headlamp that can be miniaturized and that can form a synthetic light distribution pattern (for example, a low-beam light distribution pattern) in which a hot zone is brighter. The vehicle headlamp that forms the synthetic light distribution pattern including the hot zone and a diffusion region diffused from the hot zone, includes at least one first lighting fixture unit including a laser light source and a first optical system that forms a first light distribution pattern to irradiate light forward from the laser light source and irradiate the hot zone, and at least one second lighting fixture unit including an LED light source and a second optical system that forms a second light distribution pattern to irradiate light forward from the LED light source and irradiate the diffusion region.

6 Claims, 12 Drawing Sheets

VEHICLE HEADLAMP

This application is a U.S. national phase filing under 35 U.S.C. §371 of PCT Application No. PCT/JP2012/062988, filed May 22, 2012, and claims priority thereto under 35 U.S.C. §119 to Japanese Patent Application No. 2011-115977, filed May 24, 2011, the entireties of both of which are incorporated by reference herein.

FIELD OF THE DISCLOSED SUBJECT MATTER

The presently disclosed subject matter relates to a vehicle headlamp, and particularly to a vehicle headlamp using a semiconductor laser light source and an LED (Light Emitting Diode) light source.

BACKGROUND

In the related art, there is suggested a vehicle headlamp which includes a plurality of light source units using a semiconductor light-emitting element such as an LED as a light source and which synthesizes a target light distribution pattern by overlapping a plurality of light distribution patterns formed with the light irradiated from the plurality of light source units (for example, see Japanese Patent No. 4365253 "PTL 1").

The vehicle headlamp described in PTL 1 includes: a light focusing unit including an LED with relatively high luminance and a reflector of substantially ellipse spherical shape that forms a hot zone by focusing light from the LED with high luminance; and a diffusion unit including an LED with relatively low luminance and a diffusion optical system that forms a diffusion region by diffusing light from the LED with low luminance.

According to the vehicle headlamp described in PTL 1, it is possible to form a synthetic light distribution pattern in which a hot zone is brighter (for example, a low-beam light distribution pattern), by overlapping a hot zone formed with the light irradiated from the light focusing unit (that is, the light from the LED with relatively high luminance, which is focused by the reflector of a substantially ellipse spherical shape) and the diffusion region formed with the light irradiated from the diffusion unit (that is, the light from the LED with relatively low luminance, which is diffused by the diffusion optical system).

However, in the vehicle headlamp described in PTL 1, although an LED equal to or above a certain light-emitting size is required to secure the brightness requested in the hot zone, it may be necessary to improve the light harvesting using a reflector equal to or above a certain size in order to focus the light (light source image) from the LED equal to or above the certain light-emitting size to the hot zone.

Therefore, in the vehicle headlamp described in PTL 1, although it is possible to form a synthetic light distribution pattern in which the hot zone is brighter (for example, the low-beam light distribution pattern), there is a problem that it is not possible to miniaturize the optical system including the reflector (that is, miniaturize the headlamp). If the optical system including the reflector is miniaturized (that is, the headlamp is miniaturized), the light (light source image) from the LED equal to or above the certain light-emitting size cannot be sufficiently focused, the vehicle front side other than the hot zone is brightened too and therefore there is a problem that the brightness feeling in the distance decreases (that is, the distance visibility decreases).

The disclosed subject matter is made in view of such conditions and can be configured to provide a vehicle headlamp that can be miniaturized and that can form a synthetic light distribution pattern (for example, a low-beam light distribution pattern) in which a hot zone is brighter.

SUMMARY OF THE DISCLOSED SUBJECT MATTER

According to a first aspect of the disclosed subject matter, a vehicle headlamp can be provided that forms a synthetic light distribution pattern including a hot zone and a diffusion region diffused from the hot zone, includes: at least one first lighting fixture unit including a laser light source and a first optical system that forms a first light distribution pattern to irradiate light forward from the laser light source and irradiate the hot zone; and at least one second lighting fixture unit including an LED light source and a second optical system that forms a second light distribution pattern to irradiate light forward from the LED light source and irradiate the diffusion region.

In the vehicle headlamp according to the first aspect of the disclosed subject matter, since it adopts a configuration to irradiate the light from the laser light source with higher luminance than the LED to the hot zone, as compared with the related art in which the hot zone is irradiated with light from the LED, it is possible to form the vehicle headlamp in which it is possible to form a synthetic light distribution pattern (for example, low-beam light distribution pattern or main-beam light distribution pattern) optimal to a vehicle headlamp excellent in the distance visibility with a brighter hot zone.

Moreover, in the vehicle headlamp according to the first aspect, since it adopts a configuration to irradiate the light from the laser light source with higher luminance than the LED to the hot zone, as compared with the related art in which the hot zone is irradiated with light from the LED, it is possible to irradiate the hot zone in a sufficiently bright manner with a less number of first lighting fixture units. Thus, according to the first aspect, since it is possible to decrease the number of first lighting fixture units, in proportion to this, it is possible to realize the space saving of the vehicle headlamp.

Moreover, in the vehicle headlamp according to the first aspect, since it uses a laser light source with higher luminance than the LED and the light-emitting size closer to a point light source than the LED, even if the first optical system (for example, reflecting surface) is miniaturized (that is, even if the first lighting fixture unit is miniaturized), it is possible to focus light from the laser light source (that is, a light source image with higher luminance and smaller size than the LED) to the hot zone. That is, according to the first aspect, it is possible to form the vehicle headlamp which can be miniaturized as compared with a headlamp using an LED in the related art and in which it is possible to form an synthetic light distribution pattern (for example, low-beam light distribution pattern or main-beam light distribution pattern) optimal to a vehicle headlamp excellent in the distance visibility with a suppressed brightness feeling in the vehicle front and a brighter hot zone. Thus, according to the first aspect, since it is possible to miniaturize the vehicle headlamp, in proportion to this, it is possible to realize the space saving of the vehicle headlamp.

Moreover, in the vehicle headlamp according to the first aspect, since the laser light source and the LED light source are not incorporated in one unit but the laser light source and the LED light source are unitized respectively, it is possible to adequately increase or decrease their number in proportion to the brightness of a requested light distribution pattern.

According to a second aspect of the disclosed subject, in the vehicle headlamp according to the first aspect, the laser light source includes a semiconductor laser light source and a wavelength conversion member that is arranged apart from the semiconductor laser light source, receives laser light from the semiconductor laser light source and generates light of a longer wavelength than a wavelength of the light from the semiconductor laser light source.

As for a wavelength conversion member such as a phosphor, when the ambient temperature rises, the efficiency tends to decrease (temperature quenching). Moreover, most of the power supplied to the semiconductor laser light source becomes thermal energy, except for optical energy. Therefore, when the wavelength conversion member is arranged near the semiconductor laser light source, the efficiency of the phosphor decreases due to the influence of thermal energy generated from the semiconductor laser light source.

In the vehicle headlamp according to the second aspect, since the wavelength conversion member is arranged apart from the semiconductor laser light source, it is possible to prevent or reduce the decrease of the efficiency of the phosphor due to the influence of thermal energy generated from the semiconductor laser light source.

According to a third aspect of the disclosed subject matter, in the vehicle headlamp according to the second aspect, the area of a light source image of the semiconductor laser light source irradiated to the wavelength conversion member is equal to or less than 1 square millimeter.

In the vehicle headlamp according to the third aspect, since the area of the light source image of the semiconductor laser light source projected to the wavelength conversion member is equal to or less than 1 square millimeter, it is possible to make the semiconductor laser light source function as a light source which has higher luminance than an LED and which has the light-emitting size close to a point light source.

Moreover, in the vehicle headlamp according to the third aspect, since it is possible to make the wavelength conversion member function as a light source which has higher luminance than an LED and which has the light-emitting size close to a point light source, even if the first optical system (for example, reflecting surface or projection lens) is miniaturized (that is, even if the first lighting fixture unit is miniaturized), it is possible to focus the light from the light source (that is, a light source image with higher luminance and smaller size than the LED) to a hot zone. That is, it is possible to miniaturize the first lighting fixture unit and therefore miniaturize the vehicle headlamp including this.

That is, according to the third aspect, it is possible to form the vehicle headlamp which can be miniaturized as compared with a headlamp using an LED in the related art and in which it is possible to form an synthetic light distribution pattern (for example, low-beam light distribution pattern or main-beam light distribution pattern) optimal to a vehicle headlamp excellent in the distance visibility with a suppressed brightness feeling in the vehicle front and a brighter hot zone. Thus, according to the third aspect, since it is possible to miniaturize the vehicle headlamp, in proportion to this, it is possible to realize the space saving of the vehicle headlamp.

According to a fourth aspect of the disclosed subject, in the vehicle headlamp according to any one of the first to third aspects, the laser light source and the LED light source are electrically connected in series to a lighting circuit.

In the vehicle headlamp according to the fourth aspect, since the first lighting fixture unit (laser light source) and the second lighting fixture unit (LED light source) are electrically connected in series to the lighting circuit, it is assumed that the same current is supplied from the lighting circuit to the first lighting fixture unit (laser light source) and the second lighting fixture unit (LED light source). Therefore, it is possible to prevent or reduce the luminance unevenness due to the characteristic difference between individual laser light sources and the characteristic difference between individual LED light sources.

According to the disclosed subject, it is possible to provide a vehicle headlamp that can be miniaturized and that can form a synthetic light distribution pattern (for example, a low-beam light distribution pattern) in which a hot zone is brighter.

BRIEF DESCRIPTION OF DRAWINGS

The accompanying drawings, which are included to provide a further understanding of the disclosed subject matter and are incorporated in and constitute a part of this specification, illustrate aspects of the disclosed subject matter and together with the description serve to explain the principles of the disclosed subject matter. In the drawings.

DETAILED DESCRIPTION OF EXEMPLARY EMBODIMENTS

First Aspect

In the following, a vehicle headlamp according to the first aspect of the disclosed subject matter is described with reference to the drawings.

Figure 1A:
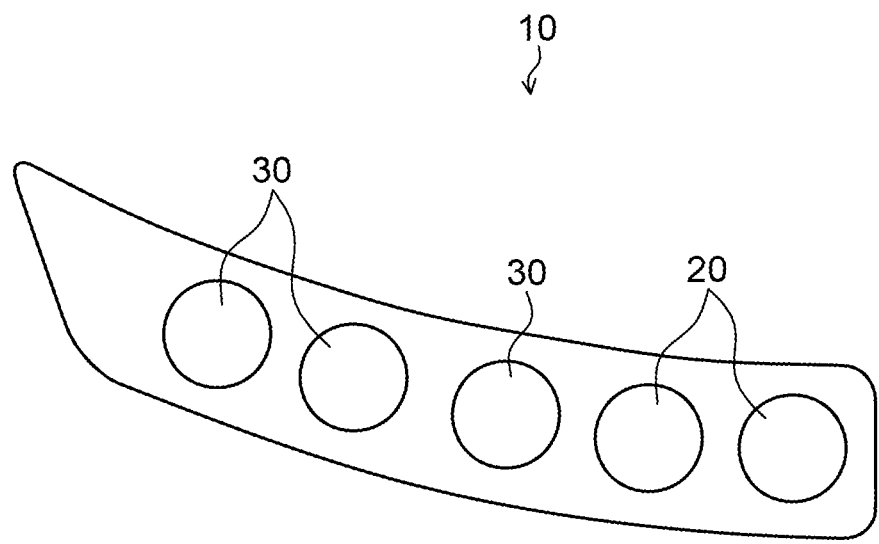
FIG. 1A is an example of a vehicle headlamp located at a right side of a vehicle front end (the right side seen from a driver side, the same is applied to the following).
Figure 1B:
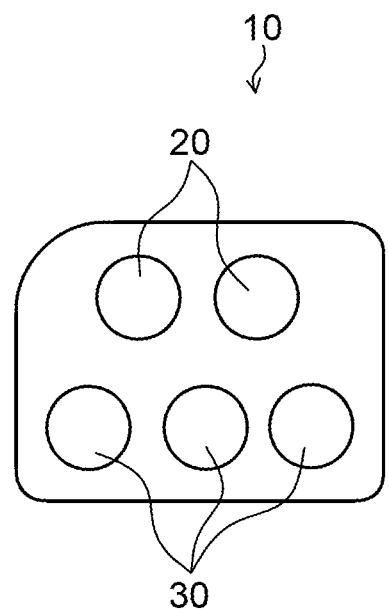
FIG. 1B is another example of a vehicle headlamp located at the right side of the vehicle front end.

FIGS. 1A and 1B are examples of a vehicle headlamp 10 arranged in a right side of a vehicle front end.

The vehicle headlamp 10 includes at least one light focusing unit 20 (two light focusing units 20 are illustrated in FIGS. 1A and 1B) corresponding to the first lighting fixture unit and at least one diffusion unit 30 (three diffusion units 30 are illustrated in FIGS. 1A and 1B) corresponding to the second lighting fixture unit of the disclosed subject matter, and so on. Here, each of the units 20 and 30 can adequately increase or decrease its number in proportion to the brightness of a requested light distribution pattern. A known aiming mechanism (not illustrated) is coupled with each of the units 20 and 30 such that optical axis adjustment is possible.

Light Focusing Unit 20

Figure 2:
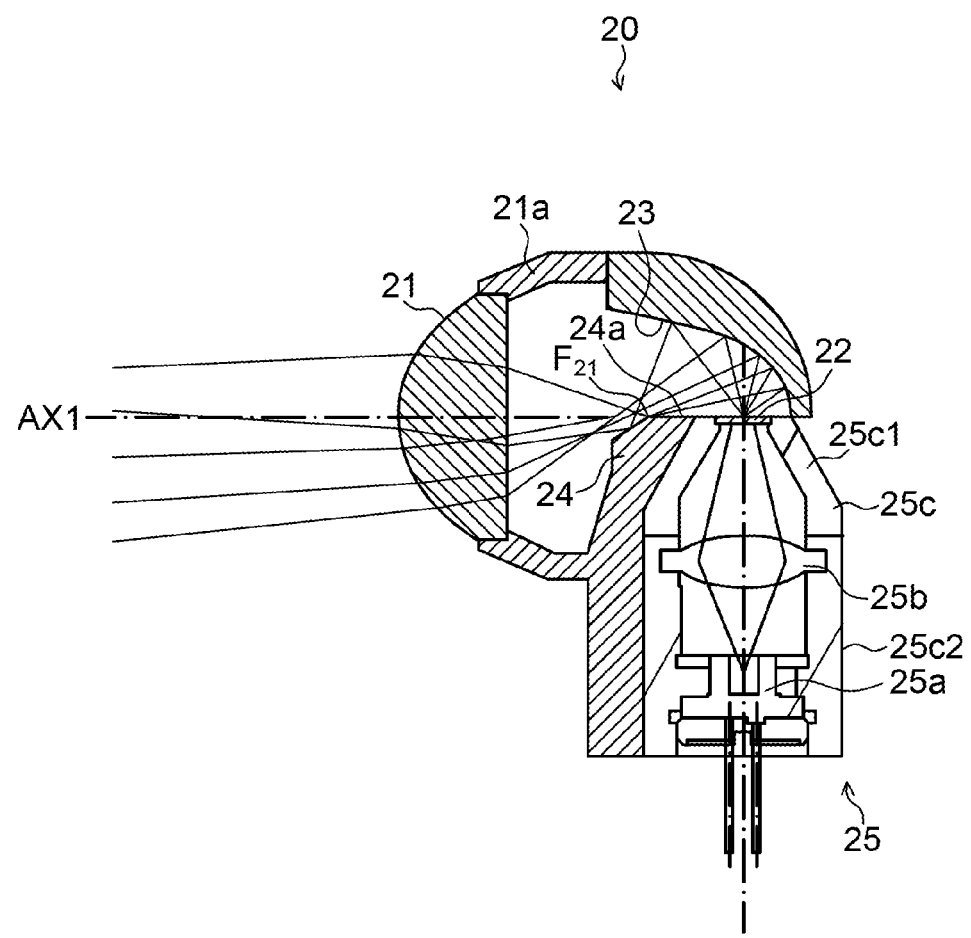
FIG. 2 is a longitudinal sectional view in which an exemplary light focusing unit is cut by a vertical surface including an optical axis AX1.

FIG. 2 is a longitudinal sectional view in which the light focusing unit 20 is cut by a vertical surface including an optical axis AX1.

The light focusing unit 20 is a lighting fixture unit of a projector type. As illustrated in FIG. 2, the light focusing unit 20 includes a projection lens 21 arranged on the optical axis AX1 that extends in the vehicle front-back direction, a phosphor 22 which is arranged on the vehicle rear side of a rear-side focus $F_{21}$ of the projection lens 21 and which is arranged on the optical axis AX1, a reflecting surface 23 that reflects light from the phosphor 22 so as to be focused near the optical axis AX1, a shade 24 arranged between the projection lens 21 and the phosphor 22, and a laser optical system 25 that irradiates a laser light to the phosphor 22. The projection lens 21 and the reflecting surface 23, and so on, correspond to the first optical system.

The projection lens 21 is a plane-convex aspherical lens in which the vehicle front-side surface is convex and the vehicle rear-side surface is planar. For example, the projection lens 21 is held by a lens holder 21a and arranged on the optical axis AX1. In the present aspect, from the viewpoint of presentation, the projection lens 21 is assumed to have the same diameter as a projection lens 31 of the following diffusion unit 30. Here, from the optical viewpoint, the projection lens 21 and the projection lens 31 may have different diameters.

The phosphor 22 is a wavelength conversion member (which is a YAG (Yttrium Aluminum Garnet) phosphor in the present aspect as an example) that receives laser light from the laser optical system 25 and generates long-wavelength light from a semiconductor laser light source 25a. In the present aspect, a phosphor ceramic (for example, thickness: 80 μm, YAG concentration: 20%, concentration of a ceramic material such as alumina: 80%) is used as the phosphor 22. Here, the thickness of the phosphor ceramic, the concentration of YAG and the concentration of a ceramic material such as alumina are not limited to these and can be adequately adjusted. The phosphor 22 is held by a laser holder 25c and arranged on the vehicle rear side of the rear-side focus $F_{21}$ of the projection lens 21 and on the optical axis AX1.

The phosphor 22 emits white light (pseudo-white light) by the color mixture of the laser light from the laser optical system 25 which penetrates this and the light from the phosphor 22 which is excited by the laser light entered from the laser optical system 25 and which emits the light. The quantity of heat generated from the phosphor 22 is released by operation of the laser holder 25c made of metallic materials (for example, made of aluminum).

In the present aspect, as the phosphor 22, a phosphor having a shape which extends in the vehicle width direction (the direction orthogonal to a paper surface in FIG. 2) and which has substantially the same size (for example, a slightly larger size than a light source image of the semiconductor laser light source 25a) as a light source image (whose area is equal to or less than 1 square millimeter) of the semiconductor laser light source 25a projected by a condenser lens 25b, is used.

Here, an explanation is given to the reason to use the phosphor of substantially the same size as the light source image (whose area is equal to or less than 1 square millimeter) of the semiconductor laser light source 25a, which is projected by the condenser lens 25b.

If an image (the light source image of the semiconductor laser light source 25a) focused and formed in the phosphor 22 has a smaller size than the phosphor 22, the light-emitting range expands by light propagation and therefore the light focusing unit 20 enlarges. On the other hand, if the image (the light source image of the semiconductor laser light source 25a) focused and formed in the phosphor 22 is larger than the phosphor 22, the light use efficiency decreases to the extent that the light that does not enter the phosphor 22 is lost.

To prevent these, the size (area) of the phosphor 22 is assumed to be slightly larger than the image (the light source image of the semiconductor laser light source 25a) focused and formed in the phosphor 22. By this means, since it is possible to realize a substantial point light source of the same size as (a light-emitting portion of) the semiconductor laser light source 25a, it is possible to form the small-size light focusing unit 20 as compared with a case where the image focused and formed in the phosphor 22 has a smaller size than the phosphor 22.

Moreover, since almost all of the laser light from the laser optical system 25 enters the phosphor 22 and it is hardly lost, the light use efficiency improves as compared with a case where the image focused and formed in the phosphor 22 is larger than the phosphor 22.

Moreover, even if the dimension errors of individual parts forming the light focusing unit 20 accumulate and the projection position of the light source image of the semiconductor laser light source 25a shifts in some degree, it is possible to reliably project the light source image of the semiconductor laser light source 25a to the phosphor 22.

The above is a reason to use the phosphor 22 of substantially the same size as the light source image (whose area is equal to or less than 1 square millimeter) of the semiconductor laser light source 25a, which is projected by the condenser lens 25b.

The reflecting surface 23 is arranged to cover the upper side of the phosphor 22 such that the light emitted from the phosphor 22 to the upper side enters. As for the reflecting surface 23, the cross-sectional shape including the optical axis AX1 is set to the substantially elliptical shape and the eccentricity is set to gradually increase from the vertical cross-section to the horizontal cross-section. By this means, the light from the phosphor 22, which is reflected in the reflecting surface 23, is substantially focused in the slightly forward side of the rear-side focus $F_{21}$ in the vertical cross-section and substantially focused in a more forward position in the horizontal cross-section than the vertical cross-section.

Figure 3:
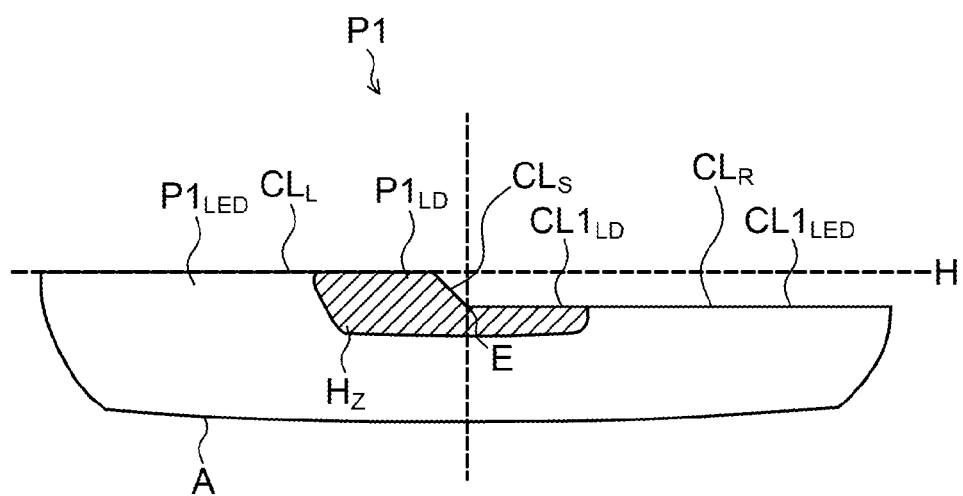
FIG. 3 is an example of low-beam light distribution pattern P1 that is a synthetic light distribution pattern synthesizing a light-focus light-distribution pattern $P1_{LD}$ formed by an exemplary light focusing unit and a diffusion light distribution pattern $P1_{LED}$ formed by an exemplary diffusion unit in accordance with principles of the presently disclosed subject matter.

The shade 24 includes a mirror surface 24a that extends from the rear-side focus $F_{21}$ of the projection lens 21 to the side of the phosphor 22. The light that enters the mirror surface 24a and is reflected upward is refracted in the projection lens 21 and heads for the road direction. That is, the light that enters the mirror surface 24a is refracted in the boundary of the cutoff line and overlapped over a light distribution pattern below the cutoff line. In this way, as illustrated in FIG. 3, light-focus light-distribution pattern $P1_{LD}$ including a cutoff line $CL1_{LD}$ that irradiates a hot zone Hz in low-beam light distribution pattern P1 that is a synthetic light distribution pattern, is formed.

The laser optical system 25 includes the semiconductor laser light source 25a arranged under the phosphor 22 such that the irradiation direction becomes vertically upward, and the condenser lens 25b arranged between the phosphor 22 and the semiconductor laser light source 25a.

The phosphor 22, the semiconductor laser light source 25a and the condenser lens 25b are unitized by being arranged in the vertical direction below the optical axis AX1 and fixed to the laser holder 25c made of a cylindrical metallic material (for example, aluminum) that extends to the vertical direction. By this arrangement, since the direction dimension of the optical axis AX1 of the light focusing unit 20 is substantially up to the rear end of the reflecting surface 23, it is possible to shorten the direction dimension of the optical axis AX1 of the light focusing unit 20. Here, the laser holder 25c and the shade 24 are integrally formed.

Moreover, since the phosphor 22 is arranged apart from the semiconductor laser light source 25a, the following effect is provided.

As for a wavelength conversion member such as the phosphor 22, when the ambient temperature rises, the efficiency tends to decrease (temperature quenching). Moreover, most of the power supplied to the semiconductor laser light source 25a becomes thermal energy, except for optical energy. Therefore, when the phosphor 22 is arranged near the semiconductor laser light source 25a, the efficiency of the phosphor 22 decreases due to the influence of thermal energy generated from the semiconductor laser light source 25a.

However, in the present aspect, since the phosphor 22 is arranged apart from the semiconductor laser light source 25a, it is possible to prevent or reduce the decrease of the efficiency of the phosphor 22 due to the influence of thermal energy generated from the semiconductor laser light source 25a.

The laser holder 25c includes a pyramidal cylindrical portion 25c1 that becomes narrower in a pyramidal shape (for example, a conical cylindrical portion that becomes narrower in a conical shape) as being closer to the vertical upper side (point), and a cylindrical portion 25c2 (for example, a conical cylindrical portion) that is arranged below the pyramidal cylindrical portion 25c1 and extends in the vertical direction.

The phosphor 22 is fixed to the point of the pyramidal cylindrical portion 25c1 so as to cover an aperture formed in the point. The semiconductor laser light source 25a is a laser diode that emits blue laser light (wavelength: 450 [nm]), for example, and is fixed to the lower end in the cylindrical portion 25c2. The condenser lens 25b is subjected to position adjustment such that the area of the light source image of the semiconductor laser light source 25a projected to the phosphor 22 is equal to or less than 1 square millimeter, and is fixed to the upper end in the cylindrical portion 25c2.

According to the light focusing unit 20 of the above-mentioned configuration, the laser light emitted from the laser light source 25a is focused by operation of the condenser lens 25b and irradiated to the phosphor 22. That is, the light source image of the semiconductor laser light source 25a is projected to the phosphor 22. In the present aspect, it is assumed that the area of the light source image of the semiconductor laser light source 25a projected to the phosphor 22 is equal to or less than 1 square millimeter and has a shape (for example, oval, circular or rectangular light source image) that extends in the vehicle width direction (the direction orthogonal to the paper surface in FIG. 2). The oval or circular light source image can be formed by, for example, adjusting the focal position of the condenser lens 25b. The rectangular light source image can be formed by, for example, covering the light-emitting surface of the semiconductor laser light source 25a with a mask member in which a rectangular aperture is formed.

The phosphor 22 to which the laser light was irradiated emits white light (pseudo-white light) by the color mixture of the laser light from the laser optical system 25 which penetrates the phosphor 22 and the light from the phosphor 22 which is excited by the laser light entered from the laser optical system 25 and which emits the light. Since the area of the light source image of the semiconductor laser light source 25a projected to the phosphor 22 is equal to or less than 1 square millimeter, it is possible to make the phosphor 22 function as a light source which has higher luminance than an LED and which has the light-emitting size close to a point light source. For example, in a case where the current supplied to the semiconductor laser light source 25a is 1 [A], the luminance is 200 [cd/mm$^2$]

Thus, since it is possible to make the phosphor 22 function as a light source which has higher luminance than an LED and which has the light-emitting size close to a point light source, even if the reflecting surface 23 is miniaturized (that is, even if the light focusing unit 20 is miniaturized), it is possible to focus the light from the phosphor 22 (that is, a light source image with higher luminance and smaller size than the LED) to the hot zone Hz. By this means, it is possible to miniaturize the light focusing unit 20 and therefore miniaturize the vehicle headlamp 10 including this.

The light, which is emitted from the phosphor 22 that functions as a light source having higher luminance than an LED and the light-emitting size close to a point light source and which enters the reflecting surface 23, is reflected on the reflecting surface 23, focused the near rear-side focus $F_{21}$ of the projection lens 21 and subsequently irradiated forward through the projection lens 21. In this way, light-focus light-distribution pattern $P1_{LD}$ is formed, which irradiates the hot zone Hz in the low-beam light distribution pattern P1 that is a synthetic light distribution pattern, on a virtual vertical screen (which is arranged in, for example, a position about 25 m forward the vehicle front end portion) (see FIG. 3). The light-focus light-distribution pattern $P1_{LD}$ includes the cutoff line $CL1_{LD}$ defined by the shade 24 in the upper end edge. Here, the light focusing unit 20 is subjected to optical axis adjustment by a known aiming mechanism (not illustrated) such that the light-focus light-distribution pattern $P1_{LD}$ irradiates the hot zone Hz in the low-beam light distribution pattern P1 that is a synthetic light distribution pattern.

Next, a modification example of the light focusing unit 20 is described.

A light guide member (not illustrated) such as an optical fiber may be arranged between the phosphor 22 and the semiconductor laser light source 25a, where the light guide member includes one end surface and the other end surface on the opposite side, guides light, which is entered from one end surface to the inside, to the other end surface and emits the light from the other end surface. The same is applied to each of the light focusing units 50 to 80 described below.

For example, the light guide member such as an optical fiber is arranged such that one end surface faces the laser light source 25a of a light guide plate and the other end surface faces the phosphor 22.

The light focusing unit 20 of the present modification example functions as follows.

That is, the laser light emitted from laser light source 25a is introduced from one end surface of the light guide member such as the optical fiber to the inside, guided to the other end surface and emitted from the other end surface to irradiate the phosphor 22. In the present aspect, the area in which the phosphor 22 is irradiated is assumed to be equal to or less than 1 square millimeter and have a shape (for example, oval, circular or rectangular shape) that extends in the vehicle width direction (the direction orthogonal to the paper surface in FIG. 2). The oval, circular or rectangular shape can be formed by, for example, covering the other end surface with a mask member in which an oval, circular or rectangular aperture is formed, or adjusting the shape of the other end surface of the light guide member such as the optical fiber.

The phosphor 22 to which the laser light was irradiated emits white light (pseudo-white light) by the color mixture of the laser light from the laser optical system 25 which penetrates the phosphor 22 and the light from the phosphor 22 which is excited by the laser light entered from the laser optical system 25 and which emits the light. Since the area to irradiate the phosphor 22 is equal to or less than 1 square millimeter, it is possible to make the phosphor 22 function as a light source which has higher luminance than an LED and which has the light-emitting size close to a point light source.

Diffusion Unit 30

Figure 4:
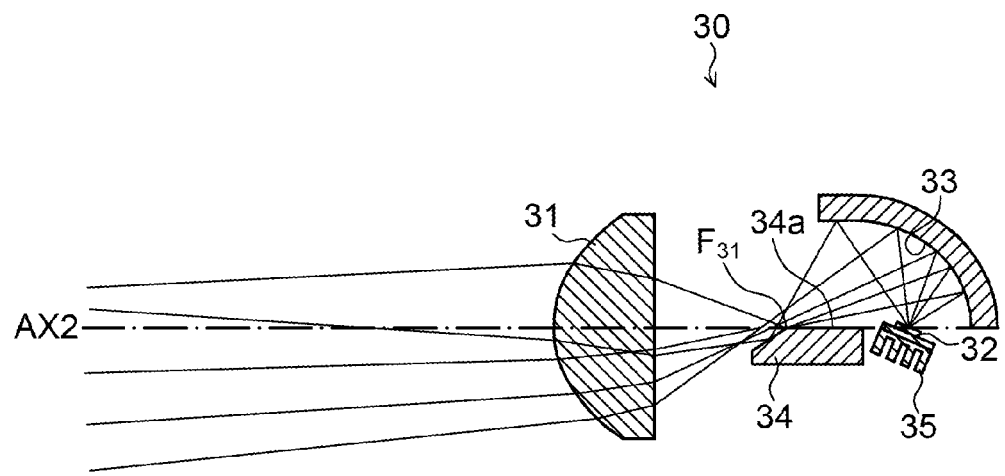
FIG. 4 is a longitudinal sectional view (including a ray diagram) in which an exemplary diffusion unit is cut by a vertical surface including an optical axis AX2.

FIG. 4 is a longitudinal sectional view in which the diffusion unit 30 is cut by a vertical surface including the optical axis AX2 of the diffusion unit 30.

The diffusion unit 30 is a lighting fixture unit of a projector type, and, as illustrated in FIG. 4, includes the projection lens 31 arranged on the optical axis AX2 that extends in the vehicle front-back direction, an LED light source 32 arranged on the vehicle rear side of a rear-side focus $F_{31}$ of the projection lens 31 on the optical axis AX2, a reflecting surface 33 that reflects light from the LED light source 32 so as to be focused near the optical axis AX2, and a shade 34 arranged between the projection lens 31 and the LED light source 32, and so on. The projection lens 31 and the reflecting surface 33, and so on, correspond to the second optical system of the disclosed subject matter.

The projection lens 31 is a plane-convex aspherical lens in which the vehicle front-side surface is convex and the vehicle rear-side surface is planar. For example, the projection lens 31 is held by a lens holder (not illustrated) and arranged on the optical axis AX2.

The LED light source 32 is a white LED light source combining a blue LED chip and a yellow phosphor (a YAG phosphor in the present aspect), for example. The LED light source 32 is fixed to a heat sink 35 such that the irradiation direction becomes upward (a diagonal rear upper direction is illustrated in FIG. 4). In the present aspect, as the LED light source 32, an LED light source including two blue LED chips (for example, two chips with corners of 1 mm) arranged in the vehicle width direction (a direction orthogonal to the paper surface in FIG. 4) is used. Here, the LED chips are not limited to two but may be one or three or more.

The reflecting surface 33 is arranged to cover the upper side of the LED light source 32 such that the light emitted from the LED light source 32 to the upper side enters. As for the reflecting surface 33, the cross-sectional shape including the optical axis AX2 is set to the substantially elliptical shape and the eccentricity is set to gradually increase from the vertical cross-section to the horizontal cross-section. In this way, the light from the LED light source 32, which is reflected in the reflecting surface 33, is substantially focused in the slightly forward side of the rear-side focus $F_{31}$ in the vertical cross-section and substantially focused in a more forward position in the horizontal cross-section than the vertical cross-section.

The shade 34 includes a mirror surface 34a that extends from the rear side focus $F_{31}$ of the projection lens 31 to the side of the LED light source 32. The light that enters the mirror surface 34a and that is reflected upward is refracted in the projection lens 31 and heads for the road direction. That is, the light that enters the mirror surface 34a is refracted in the boundary of the cutoff line and overlapped over a light distribution pattern below the cutoff line. In this way, as illustrated in FIG. 3, diffusion light distribution pattern $P1_{LED}$ including the cutoff line $CL1_{LED}$ that irradiates diffusion region A diffused from the hot zone Hz in the low-beam light distribution pattern P1 that is a synthetic light distribution pattern, is formed.

According to the diffusion unit 30 of the above-mentioned configuration, the light that is emitted from the LED light source 32 and entered into the reflecting surface 33 is reflected on the reflecting surface 33, focused near the rear-side focus $F_{31}$ of the projection lens 31 and subsequently irradiated forward through the projection lens 31. In this way, the diffusion light distribution pattern $P1_{LED}$ is formed, which irradiates the diffusion region A in the low-beam light distribution pattern P1 that is a synthetic light distribution pattern, on a virtual vertical screen (which is arranged in, for example, a position about 25 m forward the vehicle front end portion) (see FIG. 3). The diffusion light distribution pattern $P1_{LED}$ includes the cutoff line $CL1_{LED}$ defined by the shade 34 in the top edge. Here, the diffusion unit 30 is subjected to optical axis adjustment by a known aiming mechanism (not illustrated) such that the diffusion light-distribution pattern $P1_{LED}$ irradiates the diffusion region A in the low-beam light distribution pattern P1 that is a synthetic light distribution pattern.

Lighting Circuit

Figure 5:
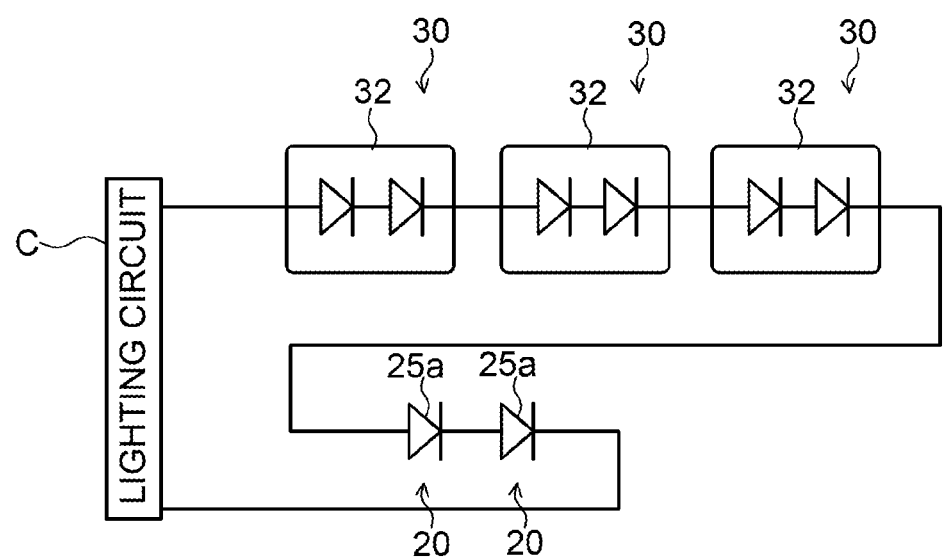
FIG. 5 is a circuit example to light up the vehicle headlamp of FIG. 1.

FIG. 5 is a circuit example to light the vehicle headlamp 10. The parallel connection and the serial connection (see FIG. 5) are possible as the connection mode of the units 20 and 30.

However, when the units 20 and 30 are connected in parallel, there is a problem that luminance unevenness occurs due to the characteristic difference between individual semiconductor laser light sources 25a and the characteristic difference between individual LED light sources 32 (for example, a difference in the forward voltage). Moreover, when the units 20 and 30 are connected in parallel, since the current is divided, the current flowed in each line decreases and the light fluxes from the individual units 20 and 30 decrease, there is a problem that it may be necessary to increase the number of units 20 and 30 to acquire sufficient light fluxes.

Although it is possible to prevent or reduce the above-mentioned problem by adjusting the current flowed in each line, to realize this, there is a problem that it may be necessary to provide current control portions corresponding to the parallel number.

In the present aspect, in view of the above problems, as illustrated in FIG. 5, the light focusing units 20 (two semiconductor laser light sources 25a are exemplified in FIG. 5) and the diffusion units 30 (three LED light sources 32 are exemplified in FIG. 5) are electrically connected in series to one lighting circuit C (including a current control portion). In this way, the same current is supplied from lighting circuit C to each light focusing unit 20 (the semiconductor laser light source 25a) and each diffusion unit 30 (the LED light source 32), and it is possible to prevent or reduce the luminance unevenness due to the characteristic difference between individual semiconductor laser light sources 25a and the characteristic difference between individual LED light sources 32. Moreover, it is sufficient with only one lighting circuit C (including the current control portion). Here, in the circuit illustrated in FIG. 5, for example, in a case where the current supplied from lighting circuit C supplies is 1 [A], the luminance of the phosphor 22 is 200 [cd/mm$^2$] and the luminance of the LED light source 32 is 80 [cd/mm$^2$]

Synthetic Light Distribution Pattern P1

Next, the low-beam light distribution pattern P1 that is a synthetic light distribution pattern formed on the virtual vertical screen (for example, it is arranged in a position about 25 m forward the vehicle front end portion) by the vehicle headlamp 10 of the above-mentioned configuration is described.

FIG. 3 is an example of the low-beam light distribution pattern P1 that is a synthetic light distribution pattern that synthesizes the light-focus light-distribution pattern $P1_{LD}$ formed by the light focusing unit 20 and the diffusion light distribution pattern $P1_{LED}$ formed by the diffusion unit 30.

The cutoff line asymmetrically extends in the horizontal direction on the boundary of the V-V line that is the vertical line passing through H-V that is a vanishing point in the lighting fixture front direction, where the right side from the V-V line is formed so as to horizontally extend as an opposing lane side cutoff line $CL_R$ and the left side from the V-V line is formed so as to horizontally extend on a higher level than the opposing lane side cutoff line $CL_R$ as a driving lane side cutoff line $CL_L$. Further, the edge portion near the V-V line in this driving lane side cutoff line $CL_L$ is formed as a diagonal cutoff line $CL_S$. This diagonal cutoff line $CL_S$ extends from the intersection of the opposing lane side cutoff line $CL_R$ and the V-V line at a tilt angle (for example, about 45°) toward the diagonally upper left.

In the low-beam light distribution pattern P1, an elbow point E corresponding to the intersection point between the opposing lane side cutoff line $CL_R$ and the V-V line is positioned below H-H by approximately 0.5° to 0.6°, and the hot zone Hz that is a high luminosity region is formed so as to surround this elbow point E slightly leftward. Further, the diffusion region A diffused from the hot zone Hz is formed outside. Light from the phosphor 22 that functions as a light source having higher luminance than an LED and the light-emitting size close to a point light source is irradiated to the hot zone Hz and light from the LED light source 32 is irradiated to the diffusion region A. In this way, as compared with the related art in which a hot zone is irradiated with light from the LED, it is possible to form the optimal low-beam light distribution pattern P1 to a vehicle headlamp excellent in the distance visibility with brighter hot zone Hz.

As described above, according to the vehicle headlamp 10 of the present aspect formed with a combination of the light focusing unit 20 and the diffusion unit 30, the following effects are provided.

That is, according to the vehicle headlamp 10 of the present aspect, since there is provided a configuration in which the hot zone Hz is irradiated with light from laser light sources (the phosphor 22 and the semiconductor laser light source 25a) with higher luminance than an LED, as compared with the related art in which a hot zone is irradiated with light from the LED, it is possible to form the vehicle headlamp 10 in which it is possible to form the low-beam light distribution pattern P1 that is a synthetic light distribution pattern optimal to a vehicle headlamp excellent in the distance visibility with the brighter hot zone Hz.

Moreover, according to the vehicle headlamp 10 of the present aspect, since there is provided a configuration in which the hot zone Hz is irradiated with light from laser light sources (the phosphor 22 and the semiconductor laser light source 25a) with higher luminance than an LED, as compared with the related art in which a hot zone is irradiated with light from the LED, it is possible to irradiate the hot zone Hz in a sufficiently bright manner by a less number of light focusing units 20. Thus, according to the vehicle headlamp 10 of the present aspect, since it is possible to decrease the number of light focusing units 20, in proportion to this, it is possible to realize the space saving of the vehicle headlamp 10.

Moreover, according to the vehicle headlamp 10 of the present aspect, since laser light sources (the phosphor 22 and the semiconductor laser light source 25a) having higher luminance than an LED and the light-emitting size close to a point light source are used, even if the reflecting surface 23 is miniaturized (that is, even if the light focusing unit 20 is miniaturized), it is possible to focus light from the laser light sources (that is, light source images with higher luminance and smaller size than the LED) to the hot zone Hz.

That is, according to the vehicle headlamp 10 of the present aspect, it is possible to form the vehicle headlamp 10 which can be miniaturized as compared with a headlamp using an LED in the related art and in which it is possible to form the low-beam light distribution pattern P1 that is a synthetic light distribution pattern optimal to a vehicle headlamp excellent in the distance visibility with a suppressed brightness feeling in the vehicle front side and the brighter hot zone Hz. Thus, according to the vehicle headlamp 10 of the present aspect, since it is possible to miniaturize the vehicle headlamp 10, in proportion to this, it is possible to realize the space saving of the vehicle headlamp 10.

Moreover, according to the vehicle headlamp 10 of the present aspect, since a light spectrum from the light focusing unit 20 (the semiconductor laser light source 25a: 450 [nm], the phosphor 22: about 500 to 700 [nm]) and the light spectrum from the diffusion unit 30 (about 450 to 700 [nm]) are added (that is, 450 to 500 [nm] is supplemented), as compared with a case where a vehicle headlamp is formed using only a semiconductor laser light source, it is possible to form the low-beam light distribution pattern P1 of high color reproducibility. Here, it is possible to form overhead light distribution to illuminate a label or the like with the diffusion unit 30 of high color reproducibility.

Moreover, according to the vehicle headlamp 10 of the present aspect, laser light sources (the phosphor 22 and the semiconductor laser light source 25a) and the LED light sources 32 are incorporated in one unit but the laser light sources (the phosphor 22 and the semiconductor laser light source 25a) and the LED light sources 32 are unitized respectively, it is possible to adequately increase or decrease the numbers in proportion to the brightness of a requested light distribution pattern.

Moreover, according to the vehicle headlamp 10 of the present aspect, since the phosphor 22 is arranged apart from the semiconductor laser light source 25a (see FIG. 2), it is possible to prevent or reduce the decrease of the efficiency of the phosphor 22 due to the influence of thermal energy generated from the semiconductor laser light source 25a.

Moreover, according to the vehicle headlamp 10 of the present aspect, since the area of an light source image of the semiconductor laser light source 25a projected to the phosphor 22 is equal to or less than 1 square millimeter, it is possible to make the phosphor 22 function as a light source which has higher luminance than an LED and which has the light-emitting size close to a point light source.

Moreover, according to the vehicle headlamp 10 of the present aspect, since it is possible to make the phosphor 22 function as a light source which has higher luminance than an LED and which has the light-emitting size close to a point light source, even if the reflecting surface 23 is miniaturized (that is, even if the light focusing unit 20 is miniaturized), it is possible to focus the light from the phosphor 22 (that is, a light source image with higher luminance and smaller size than an LED) to the hot zone Hz. That is, it is possible to miniaturize the light focusing unit 20 and therefore miniaturize the vehicle headlamp 10 including this.

That is, according to the vehicle headlamp 10 of the present aspect, it is possible to form the vehicle headlamp which can be miniaturized as compared with a headlamp using an LED in the related art and in which it is possible to form the low-beam light distribution pattern P1 that is a synthetic light distribution pattern optimal to a vehicle headlamp excellent in the distance visibility with a suppressed brightness feeling in the vehicle front and the brighter hot zone Hz. Thus, according to the vehicle headlamp 10 of the present aspect, since it is possible to miniaturize the vehicle headlamp 10 (the light focusing unit 20), in proportion to this, it is possible to realize the space saving of the vehicle headlamp 10.

Moreover, according to the vehicle headlamp 10 of the present aspect, since the light focusing units 20 (two semiconductor laser light sources 25a are exemplified in FIG. 5) and the diffusion units 30 (three LED light sources 32 are exemplified in FIG. 5) are electrically connected in series to one lighting circuit C (including a current control portion) (see FIG. 5), the same current is supplied from the lighting circuit C to each light focusing unit 20 (the semiconductor laser light source 25a) and each diffusion unit 30 (the LED light source 32) and it is possible to prevent or reduce the luminance unevenness due to the characteristic difference between individual semiconductor laser light sources 25a and the characteristic difference between individual LED light sources 32. Moreover, it is sufficient with only one lighting circuit C (including the current control portion).

Moreover, according to the vehicle headlamp 10 of the present aspect, since the phosphor 22, the semiconductor laser light source 25a and the condenser lens 25b are arranged in the vertical direction below the optical axis AX1 (see FIG. 2), it is possible to shorten the direction dimension of the optical axis AX1 of the light focusing unit 20. Even by this, since it is possible to miniaturize the vehicle headlamp 10 (the light focusing unit 20), in proportion to this, it is possible to realize the space saving of the vehicle headlamp 10.

Next, a modification example is described.

In the above-mentioned aspect, although an explanation has been given to an example of forming the vehicle headlamp 10 using the light focusing unit 20 that forms the light-focus light-distribution pattern $P1_{LD}$ to irradiate the hot zone Hz and the diffusion unit 30 that forms diffusion light distribution pattern $P1_{LED}$ to irradiate the diffusion region A, the disclosed subject matter is not limited to this.

Figure 6:
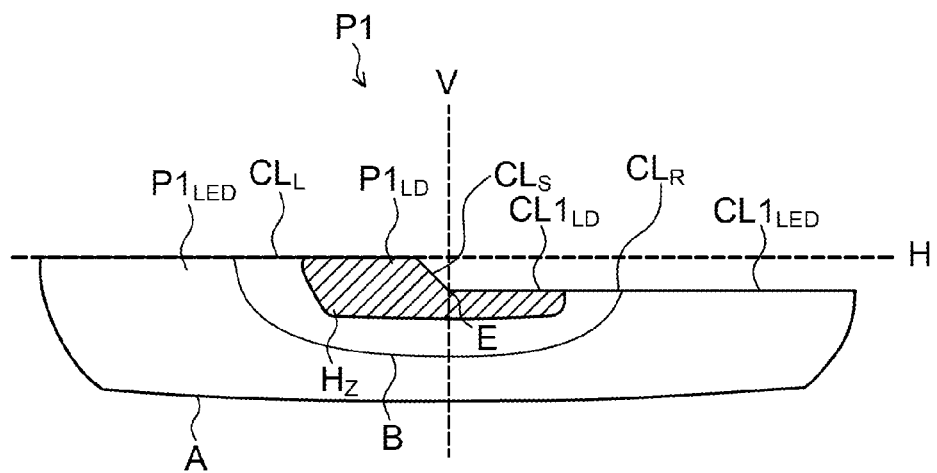
FIG. 6 is a light distribution pattern example formed by a modification of the vehicle headlamp of FIG. 1.

For example, as illustrated in FIG. 6, the vehicle headlamp 10 may be formed by further adding at least one medium diffusion unit that forms a light distribution pattern to irradiate an intermediate region B between the hot zone Hz and the diffusion region A. In this way, it is possible to form the low-beam light distribution pattern P1 with a good feeling at the visual contact time at which the brightness changes from the hot zone Hz to the diffusion region A in a gradational manner. Here, the medium diffusion unit may be formed using the semiconductor laser light source 25a and the phosphor 22 in the same way as the light focusing unit 20 or may be formed using the LED light source 32 in the same way as the diffusion unit 30.

Moreover, in the above-mentioned aspect, although an explanation has been given to an example where a synthetic light distribution pattern that synthesizes the light-focus light-distribution pattern $P1_{LD}$ formed by the light focusing unit 20 and the diffusion light distribution pattern $P1_{LED}$ formed by the diffusion unit 30 is the low-beam light distribution pattern P1, the disclosed subject matter is not limited to this.

Figure 7:
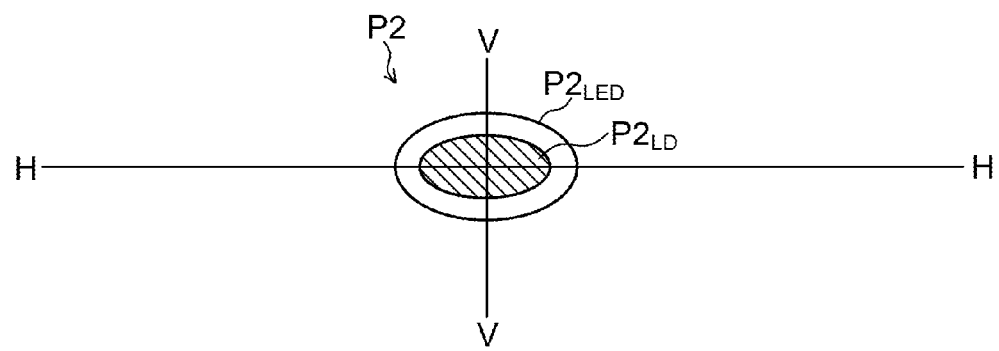
FIG. 7 is a light distribution pattern example formed by the a modification of the vehicle headlamp of FIG. 1.

For example, by omitting the shades 24 and 34 of the units 20 and 30 and adjusting the shape of the reflecting surfaces 23 and 33, as illustrated in FIG. 7, it may be possible to form the main-beam light distribution pattern P2 that is a synthetic light distribution pattern synthesizing the light-focus light-distribution pattern $P2_{LD}$ formed by the light focusing unit 20 and the diffusion light distribution pattern $P2_{LED}$ formed by the diffusion unit 30.

Moreover, in the above-mentioned aspect, although an explanation is given where the semiconductor laser light source 25a is a laser diode that emits blue laser light (wavelength: 450 [nm]) and the phosphor 22 is a wavelength conversion member (YAG phosphor) that receives laser light from the laser optical system 25 and generates long-wavelength light from the semiconductor laser light source 25a, the disclosed subject matter is not limited to this. For example, it is possible to use a laser light source that emits light of a different wavelength from the blue laser light (for example, ultraviolet light) as the semiconductor laser light source 25a and it is possible to use a phosphor that emits light of a different wavelength from yellow as the phosphor 22.

Moreover, although an explanation has been given to an example of a lighting fixture unit of a projector type in which the diffusion unit 30 uses the LED light source 32, the disclosed subject matter is not limited to this. For example, the diffusion unit 30 may be a lighting fixture unit of a so-called parabola type using an LED light source or may be a lighting fixture unit of a so-called direct projection type using an LED light source.

Second Aspect

Next, the light focusing unit 40 that is the second aspect of the light focusing unit 20 is described.

Figure 8:
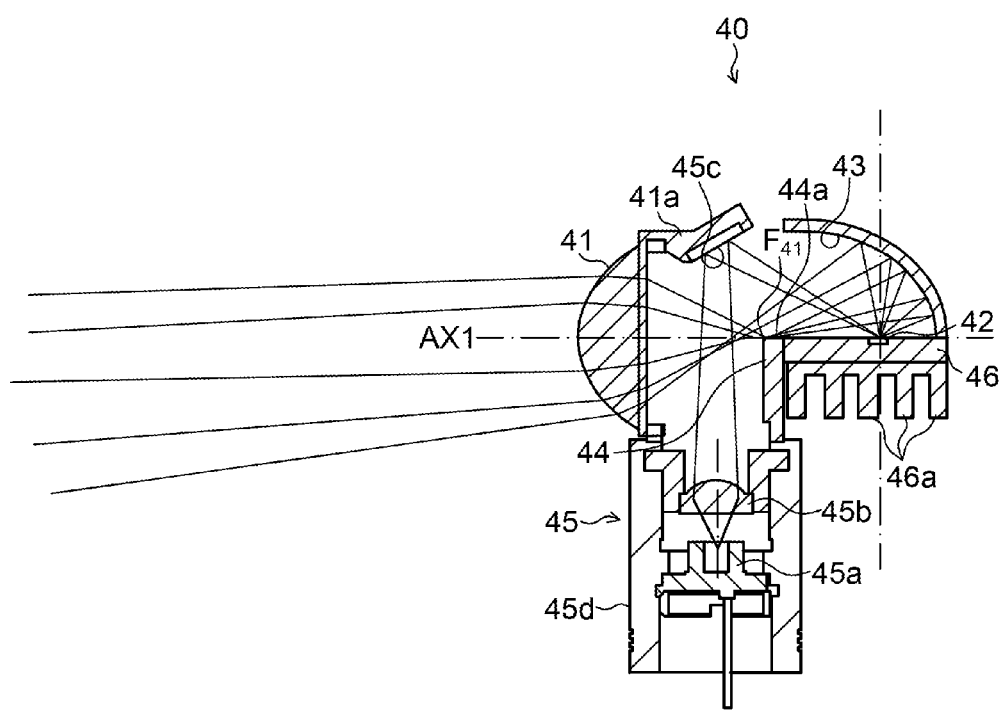
FIG. 8 is a longitudinal sectional view in which an exemplary light focusing unit is cut by a vertical surface including the optical axis AX1.

FIG. 8 is a longitudinal sectional view in which the light focusing unit 40 is cut by a vertical surface including the optical axis AX1.

The light focusing unit 40 is a lighting fixture unit of a projector type, and, as illustrated in FIG. 8, includes a projection lens 41 arranged on the optical axis AX1 that extends in the vehicle front-back direction, a phosphor 42 arranged on the vehicle rear side of a rear-side focus $F_{41}$ of the projection lens 41 on the optical axis AX1, a reflecting surface 43 that reflects light from the phosphor 42 so as to be focused near the optical axis AX1, a shade 44 arranged between the projection lens 41 and the phosphor 42, and a laser optical system 45 that irradiates laser light to the phosphor 42, and so on. The projection lens 41 and the reflecting surface 43, and so on, correspond to the first optical system of the disclosed subject matter.

The projection lens 41 is a plane-convex aspherical lens in which the vehicle front-side surface is convex and the vehicle rear-side surface is planar. For example, the projection lens 41 is held by a lens holder 41a and arranged on the optical axis AX1. In the present aspect, from the viewpoint of presentation, the projection lens 41 is assumed to have the same diameter as the projection lens 31 of the diffusion unit 30. Here, from the optical viewpoint, the projection lens 41 and the projection lens 31 may have different diameters.

The phosphor 42 is a wavelength conversion member (a YAG phosphor in the present aspect) that receives laser light from the laser optical system 45 and generates long-wavelength light from a semiconductor laser light source 45a. The phosphor 42 is attached to the upper surface of a metallic member 46 to which mirror processing such as aluminum evaporation is applied, and arranged on the vehicle rear side of the rear-side focus $F_{41}$ of the projection lens 41 on the optical axis AX1.

The phosphor 42 emits white light (pseudo-white light) by the color mixture of the laser light (scattering light) from the laser optical system 45 which is scattered in the surface (and/or the inside) and the light from the phosphor 42 which is excited by the laser light entered from the laser optical system 45 and which emits the light.

In the light isotropically emitted from the phosphor 42, the light toward the vertical lower direction is reflected in the upper surface of the metallic member 46 and goes upward.

That is, since it is possible to reuse the light toward the vertical lower direction, the light use efficiency further improves. Moreover, since the metallic member 46 includes a radiation fin 46a, it is possible to efficiently radiate the heat generated in the phosphor 42. In this way, it is possible to control the decrease in the light-emitting luminance originating in the temperature rise of the phosphor 42. In this way, the luminance of the light focusing unit 40 improves.

In the present aspect, as the phosphor 42, a phosphor having a shape which extends in the vehicle width direction (the direction orthogonal to a paper surface in FIG. 8) and which has substantially the same size (for example, a slightly larger size than a light source image of the semiconductor laser light source 45a) as a light source image (whose area is equal to or less than 1 square millimeter) of the semiconductor laser light source 45a projected by a condenser lens 45b, is used.

Here, the reason to use a phosphor of substantially the same size as the light source image (whose area is equal to or less than 1 square millimeter) of the semiconductor laser light source 45a projected by the condenser lens 45b is similar to the reason in the first aspect and therefore the explanation is omitted.

The reflecting surface 43 is arranged to cover the upper side of the phosphor 42 such that the light emitted from the phosphor 42 to the upper side (and the reflection light reflected from the upper surface of the metallic member 46 to the upper side) enters. As for the reflecting surface 43, the cross-sectional shape including the optical axis AX1 is set to the substantially elliptical shape and the eccentricity is set to gradually increase from the vertical cross-section to the horizontal cross-section. In this way, the light from the phosphor 42, which is reflected in the reflecting surface 43, is substantially focused in the slightly forward side of the rear-side focus $F_{41}$ in the vertical cross-section and substantially focused in a more forward position in the horizontal cross-section than the vertical cross-section.

The shade 44 includes a mirror surface 44a that extends from the rear-side focus $F_{41}$ of the projection lens 41 to the side of the phosphor 42. The light that enters the mirror surface 44a and is reflected upward is refracted in the projection lens 41 and heads for the road direction. That is, the light that enters the mirror surface 44a is refracted in the boundary of the cutoff line and overlapped over a light distribution pattern below the cutoff line. In this way, as illustrated in FIG. 3, the light-focus light-distribution pattern $P1_{LD}$ including the cutoff line $CL1_{LD}$ that irradiates the hot zone Hz in the low-beam light distribution pattern P1 that is a synthetic light distribution pattern, is formed.

The laser optical system 45 includes the semiconductor laser light source 45a which is arranged between the projection lens 41 and the rear-side focus $F_{41}$ of the projection lens 41 and which is arranged below the optical axis AX1, the condenser lens 45b arranged vertically above the semiconductor laser light source 45a, and a planar mirror 45c, and so on, such that irradiation direction becomes vertically upward. The semiconductor laser light source 45a and the condenser lens 45b are unitized by being fixed to a laser holder 45d fixed to the metallic member 46.

The laser holder 45d is a cylinder portion (for example, a cylindrical tube portion) that extends in the vertical direction. The semiconductor laser light source 45a is a laser diode that emits blue laser light (wavelength: 450 [nm]), for example, and is fixed to the lower end in the laser holder 45d. The condenser lens 45b is subjected to position adjustment such that the area of the light source image of the semiconductor laser light source 45a projected to the phosphor 42 is equal to or less than 1 square millimeter, and is fixed to the upper end in the laser holder 45d.

The planar mirror 45c is arranged in a position which is vertically above the semiconductor laser light source 45a and which does not interrupt reflection light from the reflecting surface 43, such that laser light from the semiconductor laser light source 45a which is focused by the condenser lens 45b enters the planar mirror 45c. The planar mirror 45c is integrally formed to the lens holder 41a that holds the projection lens 41, for example.

To improve the phototransformation efficiency of the phosphor 42, the incidence angle of (key light of) the reflection light from the planar mirror 45c with respect to the phosphor 42 is an angle between 30 degrees and 60 degrees (for example, 45 degrees). For example, this incidence angle can be adjusted within the above-mentioned angle range by adjusting the relative position relationships of the semiconductor laser light source 45a, the condenser lens 45b, the planar mirror 45c and the phosphor 42, and so on.

As described above, the semiconductor laser light source 45a, the condenser lens 45b and the planar mirror 45c, which form the laser optical system 45, are arranged in the vertical direction between the projection lens 41 and the rear-side focus $F_{41}$ of the projection lens 41 (see FIG. 8). By this arrangement, since the direction dimension of the optical axis AX1 of the light focusing unit 40 is up to the rear end of the reflecting surface 43, it is possible to shorten the direction dimension of the optical axis AX1 of the light focusing unit 40.

Moreover, since the phosphor 42 is arranged apart from the semiconductor laser light source 45a, similar to the first aspect, it is possible to prevent or reduce the decrease of the efficiency of the phosphor 42 due to the influence of thermal energy generated from the semiconductor laser light source 45a.

According to the light focusing unit 40 of the above-mentioned configuration, the laser light emitted from the laser light source 45a is focused by operation of the condenser lens 45b, reflected in the planar mirror 45c and irradiated to the phosphor 42. That is, the light source image of the semiconductor laser light source 45a is projected to the phosphor 42.

In the present aspect, it is assumed that the area of the light source image of the semiconductor laser light source 45a projected to the phosphor 42 is equal to or less than 1 square millimeter and has a shape (for example, oval, circular or rectangular light source image) that extends in the vehicle width direction (the direction orthogonal to the paper surface in FIG. 8). The oval or circular light source image can be formed by, for example, adjusting the focal position of the condenser lens 45b. The rectangular light source image can be formed by, for example, covering the light-emitting surface of the semiconductor laser light source 45a with a mask member in which a rectangular aperture is formed.

The phosphor 42 to which the laser light was irradiated emits white light (pseudo-white light) by the color mixture of the laser light (scattering light) from the laser optical system 45 which is scattered in the surface (and/or the inside) and the light from the phosphor 42 which is excited by the laser light entered from the laser optical system 45 and which emits the light. Since the area of the light source image of the semiconductor laser light source 45a projected to the phosphor 42 is equal to or less than 1 square millimeter, it is possible to make the phosphor 42 function as a light source which has higher luminance than an LED and which has the light-emitting size close to a point light source. For example, in a case where the current supplied to the semiconductor laser light source 45a is 1 [A], the luminance is 250 [cd/mm$^2$]

Thus, since it is possible to make the phosphor 42 function as a light source which has higher luminance than an LED and which has the light-emitting size close to a point light source, even if the reflecting surface 43 is miniaturized (that is, even if the light focusing unit 40 is miniaturized), it is possible to focus the light from the phosphor 42 (that is, a light source image with higher luminance and smaller size than the LED) to the hot zone Hz. In this way, it is possible to miniaturize the light focusing unit 40 and therefore miniaturize the vehicle headlamp 10 including this.

The light, which is emitted from the phosphor 42 that functions as a light source having higher luminance than an LED and the light-emitting size close to a point light source and which enters the reflecting surface 43, is reflected on the reflecting surface 43, focused near the rear-side focus $F_{41}$ of the projection lens 41 and subsequently irradiated forward through the projection lens 41. In this way, the light-focus light-distribution pattern $P1_{LD}$ is formed, which irradiates the hot zone Hz in the low-beam light distribution pattern P1 that is a synthetic light distribution pattern, on a virtual vertical screen (which is arranged in, for example, a position about 25 m forward the vehicle front end portion) (see FIG. 3). The light-focus light-distribution pattern $P1_{LD}$ includes the cutoff line $CL1_{LD}$ defined by the shade 44 in the upper end edge. Here, the light focusing unit 40 is subjected to optical axis adjustment by a known aiming mechanism (not illustrated) such that the light-focus light-distribution pattern $P1_{LD}$ irradiates the hot zone Hz in the low-beam light distribution pattern P1 that is a synthetic light distribution pattern.

Even by the vehicle headlamp formed by combining the light focusing unit 40 of the present aspect and the diffusion unit 30 of the first aspect, it is possible to provide the same effect as the vehicle headlamp 10 of the first aspect.

Third Aspect

Next, the light focusing unit 50 that is the third aspect of the light focusing unit 20 is described.

Figure 9:
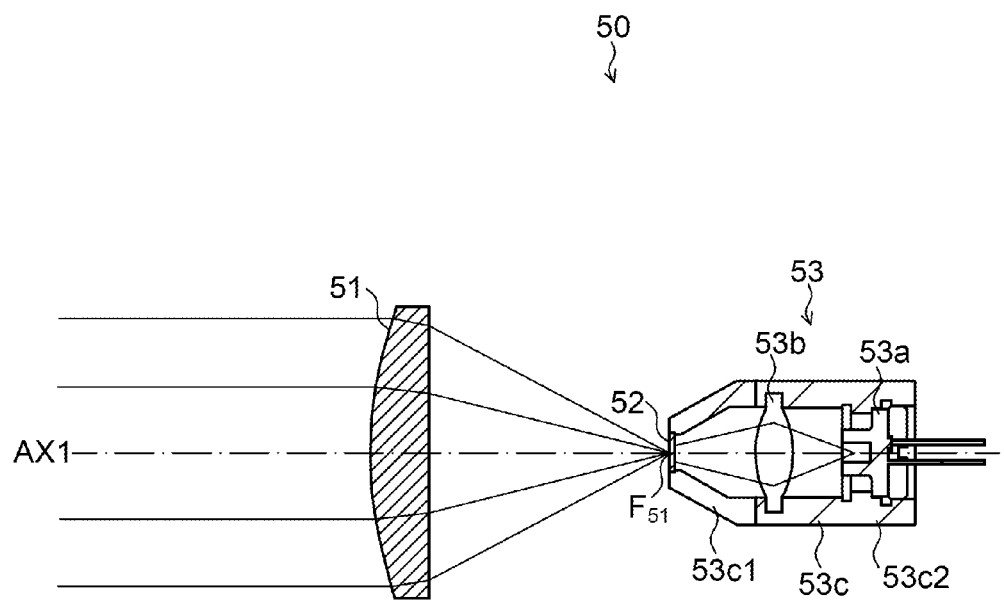
FIG. 9 is a longitudinal sectional view in which another exemplary light focusing unit is cut by a vertical surface including the optical axis AX1.

FIG. 9 is a longitudinal sectional view in which the light focusing unit 50 is cut by a vertical surface including the optical axis AX1.

The light focusing unit 50 of the present aspect is a lighting fixture unit of a so-called direct projection type, and, as illustrated in FIG. 9, includes a projection lens 51 arranged on the optical axis AX1 that extends in the vehicle front-back direction, a phosphor 52 arranged near a rear-side focus $F_{51}$ of the projection lens 51 and a laser optical system 53 that irradiates laser light to the phosphor 52, and so on. The projection lens 51 or the like corresponds to the first optical system of the disclosed subject matter.

The projection lens 51 is a plane-convex aspherical lens in which the vehicle front-side surface is convex and the vehicle rear-side surface is planar. For example, the projection lens 51 is held by a lens holder (not illustrated) and arranged on the optical axis AX1. In the present aspect, from the viewpoint of presentation, the projection lens 51 is assumed to have the same diameter as the projection lens 31 of the diffusion unit 30. Here, from the optical viewpoint, the projection lens 51 and the projection lens 31 may have different diameters.

The phosphor 52 is a wavelength conversion member (a YAG phosphor in the present aspect) that receives laser light from the laser optical system 53 and generates long-wavelength light from a semiconductor laser light source 53a. The phosphor 52 is held by a laser holder 53c and arranged near the rear-side focus $F_{51}$ of the projection lens 51.

The phosphor 52 emits white light (pseudo-white light) by the color mixture of the laser light from the laser optical system 53 which penetrates the phosphor 52 and the light from the phosphor 52 which is excited by the laser light entered from the laser optical system 53 and which emits the light.

The lower part of the phosphor 52 is covered with a light-blocking member (not illustrated) including the upper end edge corresponding to a cutoff line. The upper end edge of this light-blocking member is located near the rear-side focus $F_{51}$ of the projection lens 51.

In the present aspect, as the phosphor 52, a phosphor having a shape which extends in the vehicle width direction (the direction orthogonal to a paper surface in FIG. 9) and which has substantially the same size (for example, a slightly larger size than a light source image of the semiconductor laser light source 53a) as a light source image (whose area is equal to or less than 1 square millimeter) of the semiconductor laser light source 53a projected by a condenser lens 53b, is used.

Here, the reason for using a phosphor of substantially the same size as the light source image (whose area is equal to or less than 1 square millimeter) of the semiconductor laser light source 53a projected by the condenser lens 53b is similar to the reason in the first aspect and therefore the explanation is omitted.

The laser optical system 53 includes the semiconductor laser light source 53a arranged on the vehicle rear side of the phosphor 52 and on the optical axis AX1 and a condenser lens 53b arranged between the phosphor 52 and the semiconductor laser light source 53a, and so on.

The phosphor 52, the semiconductor laser light source 53a and the condenser lens 53b are unitized by being fixed to the laser holder 53c.

Since the phosphor 52 is arranged apart from the semiconductor laser light source 53a, similar to the first aspect, it is possible to prevent or reduce the decrease of the efficiency of the phosphor 52 due to the influence of thermal energy generated from the semiconductor laser light source 53a.

The laser holder 53c includes a pyramidal cylindrical portion 53c1 that becomes narrower in a pyramidal shape (for example, a conical cylindrical portion that becomes narrower in a conical shape) as being closer to the vertical front (point), and a cylindrical portion 53c2 (for example, a cylindrical tube portion) that is arranged on the vehicle rear side and extends in the horizontal direction.

The phosphor 52 is fixed to the point of the pyramidal cylindrical portion 53c1 so as to cover an aperture formed in the point. The semiconductor laser light source 53a is a laser diode that emits blue laser light (wavelength: 450 [nm]), for example, and is fixed to the rear anchor (vehicle rear side) in the cylindrical portion 53c2. The condenser lens 53b is subjected to position adjustment such that the area of the light source image of the semiconductor laser light source 53a projected to the phosphor 52 is equal to or less than 1 square millimeter, and is fixed to the point (vehicle front side) in the cylindrical portion 53c2.

According to the light focusing unit 50 of the above-mentioned configuration, the laser light emitted from the laser light source 53a is focused by operation of the condenser lens 53b and irradiated to the phosphor 52. That is, the light source image of the semiconductor laser light source 53a is projected to the phosphor 52. In the present aspect, it is assumed that the area of the light source image of the semiconductor laser light source 53a projected to the phosphor 52 is equal to or less than 1 square millimeter and has a shape (for example, oval, circular or rectangular light source image) that extends in the vehicle width direction (the direction orthogonal to the paper surface in FIG. 9). The oval or circular light source image can be formed by, for example, adjusting the focal position of the condenser lens 53b. The rectangular light source image can be formed by, for example, covering the light-emitting surface of the semiconductor laser light source 53a with a mask member in which a rectangular aperture is formed.

The phosphor 52 to which the laser light was irradiated emits white light (pseudo-white light) by the color mixture of the laser light from the laser optical system 53 which penetrates the phosphor 52 and the light from the phosphor 52 which is excited by the laser light entered from the laser optical system 53 and which emits the light. Since the area of the light source image of the semiconductor laser light source 53a projected to the phosphor 52 is equal to or less than 1 square millimeter, it is possible to make the phosphor 52 function as a light source which has higher luminance than an LED and which has the light-emitting size close to a point light source. For example, in a case where the current supplied to the semiconductor laser light source 53a is 1 [A], the luminance is 200 [cd/mm$^2$].

Thus, since it is possible to make the phosphor 52 function as a light source which has higher luminance than an LED and which has the light-emitting size close to a point light source, it is possible to miniaturize the light focusing unit 50 and therefore miniaturize the vehicle headlamp 10 including this.

The light emitted from the phosphor 52 that functions as a light source which has higher luminance than an LED and which has the light-emitting size close to a point light source is irradiated forward through the projection lens 51. In this way, the light-focus light-distribution pattern $P1_{LD}$ is formed, which irradiates the hot zone Hz in the low-beam light distribution pattern P1 that is a synthetic light distribution pattern, on a virtual vertical screen (which is arranged in, for example, a position about 25 m forward the vehicle front end) (see FIG. 3). The light-focus light-distribution pattern $P1_{LD}$ includes the cutoff line $CL1_{LD}$ defined by a light-blocking member (not illustrated) in the upper end edge. Here, the light focusing unit 50 is subjected to optical axis adjustment by a known aiming mechanism (not illustrated) such that the light-focus light-distribution pattern $P1_{LD}$ irradiates the hot zone Hz in the low-beam light distribution pattern P1 that is a synthetic light distribution pattern.

Even by the vehicle headlamp formed by combining the light focusing unit 50 of the present aspect and the diffusion unit 30 of the first aspect, it is possible to provide the same effect as the vehicle headlamp 10 of the first aspect.

Fourth Aspect

Next, the light focusing unit 60 that is the fourth aspect of the light focusing unit 20 is described.

Figure 10:
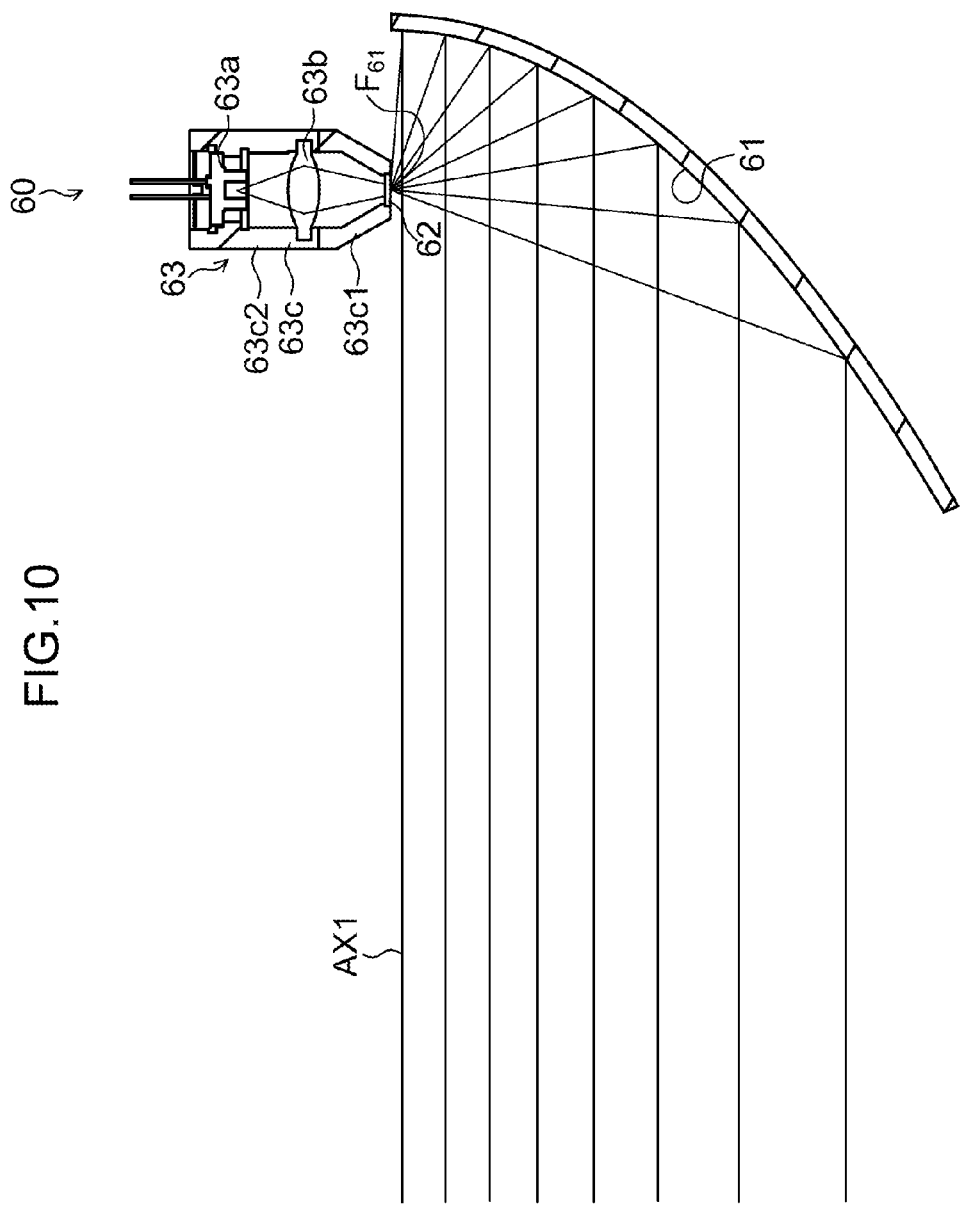
FIG. 10 is a longitudinal sectional view in which another exemplary light focusing unit is cut by a vertical surface including the optical axis AX1.

FIG. 10 is a longitudinal sectional view in which the light focusing unit 60 is cut by a vertical surface including the optical axis AX1.

The light focusing unit 60 of the present aspect is a lighting fixture unit of a so-called parabola type, and, as illustrated in FIG. 10, includes a reflecting surface 61 of a paraboloid system, a phosphor 62 arranged near a focus $F_{61}$ of the reflecting surface 61, and a laser optical system 63 that irradiates laser light to the phosphor 62, and so on. The reflecting surface 61 or the like corresponds to the first optical system of the disclosed subject matter.

The reflecting surface 61 is a paraboloid-system reflecting surface having optical the axis AX1 (rotation axis) that extends in the vehicle front-back direction, and is configured so as to reflect light that enters from the phosphor 62 and form the light-focus light-distribution pattern $P1_{LD}$ including the cutoff line $CL1_{LD}$.

The phosphor 62 is a wavelength conversion member (a YAG phosphor in the present aspect) that receives laser light from the laser optical system 63 and generates long-wavelength light from a semiconductor laser light source 63a. The phosphor 62 is held by a laser holder 63c and arranged near the focus $F_{61}$ of the reflecting surface 61.

The phosphor 62 emits white light (pseudo-white light) by the color mixture of the laser light from the laser optical system 63 which penetrates the phosphor 62 and the light from the phosphor 62 which is excited by the laser light entered from the laser optical system 63 and which emits the light.

In the present aspect, as the phosphor 62, a phosphor having a shape which extends in the vehicle width direction (the direction orthogonal to a paper surface in FIG. 10) and which has substantially the same size (for example, a slightly larger size than a light source image of the semiconductor laser light source 63a) as a light source image (whose area is equal to or less than 1 square millimeter) of the semiconductor laser light source 63a projected by a condenser lens 63b, is used.

Here, the reason for using a phosphor of substantially the same size as the light source image (whose area is equal to or less than 1 square millimeter) of the semiconductor laser light source 63a projected by the condenser lens 63b is similar to the reason in the first aspect and therefore the explanation is omitted.

The laser optical system 63 includes the semiconductor laser light source 63a arranged above the phosphor 62 such that the irradiation direction is vertically downward, and a condenser lens 63b arranged between the phosphor 62 and the semiconductor laser light source 63a, and so on.

The phosphor 62, the semiconductor laser light source 63a and the condenser lens 63b are arranged in the vertical direction above the optical axis AX1 and unitized by being fixed to the cylindrical laser holder 63c that extends in the vertical direction. By this arrangement, since the direction dimension of the optical axis AX1 of the light focusing unit 60 is substantially up to the rear end of the reflecting surface 61, it is possible to shorten the direction dimension of the optical axis AX1 of the light focusing unit 60.

Moreover, since the phosphor 62 is arranged apart from the semiconductor laser light source 63a, similar to the first aspect, it is possible to prevent or reduce the decrease of the efficiency of the phosphor 62 due to the influence of thermal energy generated from the semiconductor laser light source 63a.

The laser holder 63c includes a pyramidal cylindrical portion 63c1 that becomes narrower in a pyramidal shape (for example, a conical cylindrical portion that becomes narrower in a conical shape) as being closer to the vertical lower side (point), and a cylindrical portion 63c2 (for example, a cylindrical tube portion) that is arranged above the pyramidal cylindrical portion 63c1 and extends in the vertical direction.

The phosphor 62 is fixed to the point of the pyramidal cylindrical portion 63c1 so as to cover an aperture formed in the point. The semiconductor laser light source 63a is a laser diode that emits blue laser light (wavelength: 450 [nm]), for example, and is fixed to the upper end in the cylindrical portion 63c2. The condenser lens 63b is subjected to position adjustment such that the area of the light source image of the semiconductor laser light source 63a projected to the phosphor 62 is equal to or less than 1 square millimeter, and is fixed to the lower end in the cylindrical portion 63c2.

According to the light focusing unit 60 of the above-mentioned configuration, the laser light emitted from the laser light source 63a is focused by operation of the condenser lens 63b and irradiated to the phosphor 62. That is, the light source image of the semiconductor laser light source 63a is projected to the phosphor 62. In the present aspect, it is assumed that the area of the light source image of the semiconductor laser light source 63a projected to the phosphor 62 is equal to or less than 1 square millimeter and has a shape (for example, oval, circular or rectangular light source image) that extends in the vehicle width direction (the direction orthogonal to the paper surface in FIG. 10). The oval or circular light source image can be formed by, for example, adjusting the focal position of the condenser lens 63b. The rectangular light source image can be formed by, for example, covering the light-emitting surface of the semiconductor laser light source 63a with a mask member in which a rectangular aperture is formed.

The phosphor 62 to which the laser light was irradiated emits white light (pseudo-white light) by the color mixture of the laser light from the laser optical system 63 which penetrates this and the light from the phosphor 62 which is excited by the laser light entered from the laser optical system 63 and which emits the light. Since the area of the light source image of the semiconductor laser light source 63a projected to the phosphor 62 is equal to or less than 1 square millimeter, it is possible to make the phosphor 62 function as a light source which has higher luminance than an LED and which has the light-emitting size close to a point light source. For example, in a case where the current supplied to the semiconductor laser light source 63a is 1 [A], the luminance is 200 [cd/mm$^2$]

Thus, since it is possible to make the phosphor 62 function as a light source which has higher luminance than an LED and which has the light-emitting size close to a point light source, even if the reflecting surface 61 is miniaturized (that is, even if the light focusing unit 60 is miniaturized), it is possible to focus the light from the phosphor 62 (that is, a light source image with higher luminance and smaller size than the LED) to the hot zone Hz. In this way, it is possible to miniaturize the light focusing unit 60 and therefore miniaturize the vehicle headlamp 10 including this.

The light, which is emitted from the phosphor 62 that functions as a light source having higher luminance than an LED and the light-emitting size close to a point light source and which enters the reflecting surface 61, is reflected on the reflecting surface 61 and irradiated forward. In this way, the light-focus light-distribution pattern $P1_{LD}$ is formed, which irradiates the hot zone Hz in the low-beam light distribution pattern P1 that is a synthetic light distribution pattern, on a virtual vertical screen (which is arranged in, for example, a position about 25 m forward the vehicle front end portion) (see FIG. 3). The light-focus light-distribution pattern $P1_{LD}$ includes the cutoff line $CL1_{LD}$ in the upper end edge. Here, the light focusing unit 60 is subjected to optical axis adjustment by a known aiming mechanism (not illustrated) such that the light-focus light-distribution pattern $P1_{LD}$ irradiates the hot zone Hz in the low-beam light distribution pattern P1 that is a synthetic light distribution pattern.

Even by the vehicle headlamp formed by combining the light focusing unit 60 of the present aspect and the diffusion unit 30 of the first aspect, it is possible to provide the same effect as the vehicle headlamp 10 of the first aspect.

Fifth Aspect

Next, the light focusing unit 70 that is the fifth aspect of the light focusing unit 20 is described.

Figure 11:
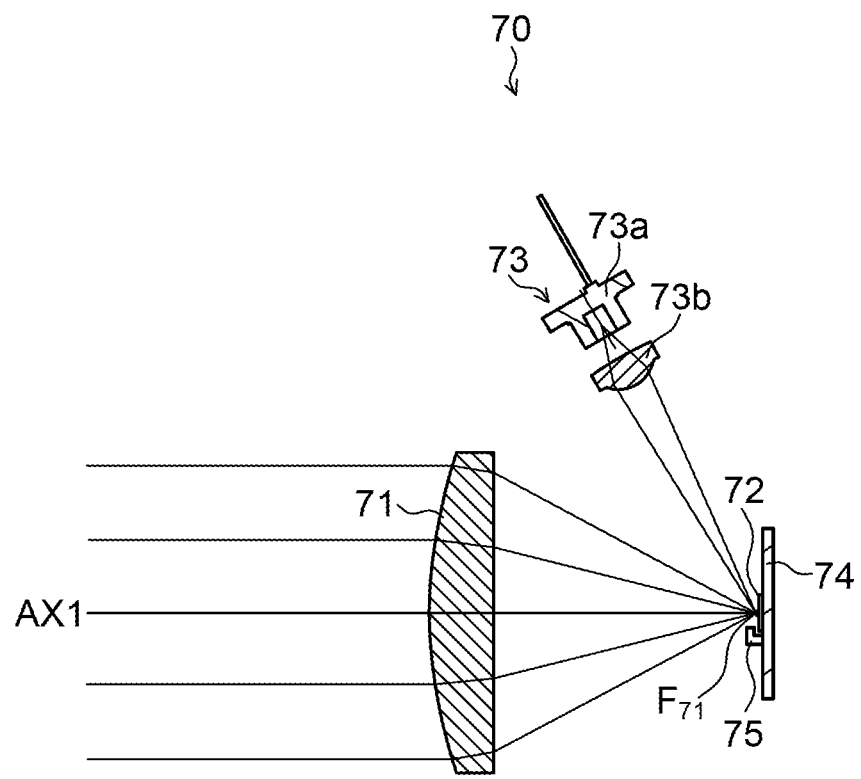
FIG. 11 is a longitudinal sectional view in which another exemplary light focusing unit is cut by a vertical surface including the optical axis AX1.

FIG. 11 is a longitudinal sectional view in which the light focusing unit 70 is cut by a vertical surface including the optical axis AX1.

The light focusing unit 70 of the present aspect is a lighting fixture unit of a so-called direct projection type, and, as illustrated in FIG. 11, includes a projection lens 71 arranged on the optical axis AX1 that extends in the vehicle front-back direction, a phosphor 72 arranged near a rear-side focus $F_{71}$ of the projection lens 71 and a laser optical system 73 that irradiates laser light to the phosphor 72, and so on. The projection lens 71 or the like corresponds to the first optical system of the disclosed subject matter.

The projection lens 71 is a plane-convex aspherical lens in which the vehicle front-side surface is convex and the vehicle rear-side surface is planar. For example, the projection lens 71 is held by a lens holder (not illustrated) and arranged on the optical axis AX1. In the present aspect, from the viewpoint of presentation, the projection lens 71 is assumed to have the same diameter as the projection lens 31 of the diffusion unit 30. Here, from the optical viewpoint, the projection lens 71 and the projection lens 31 may have different diameters.

The phosphor 72 is a wavelength conversion member (a YAG phosphor in the present aspect) that receives laser light from the laser optical system 73 and generates long-wavelength light from a semiconductor laser light source 73a. The phosphor 72 is attached to a metallic member 74 to which mirror processing such as aluminum evaporation is applied, and arranged near the rear-side focus $F_{71}$ of the projection lens 71.

The phosphor 72 emits white light (pseudo-white light) by the color mixture of the laser light (scattering light) from the laser optical system 73 which is scattered in the surface (and/or the inside) and the light from the phosphor 72 which is excited by the laser light entered from the laser optical system 73 and which emits the light.

In the light isotropically emitted from the phosphor 72, the light toward the side of the metallic member 74 is reflected in the metallic member 74 and goes toward the projection lens 71. That is, since it is possible to reuse the light toward the side of the metallic member 74, the light use efficiency further improves.

The lower part of the phosphor 72 is covered with a light-blocking member 75 including the upper end edge corresponding to a cutoff line. The upper end edge of this light-blocking member 75 is located near the rear-side focus $F_{71}$ of the projection lens 71.

In the present aspect, as the phosphor 72, a phosphor having a shape which extends in the vehicle width direction (the direction orthogonal to a paper surface in FIG. 11) and which has substantially the same size (for example, a slightly larger size than a light source image of the semiconductor laser light source 73a) as a light source image (whose area is equal to or less than 1 square millimeter) of the semiconductor laser light source 73a projected by a condenser lens 73b, is used.

Here, the reason for using a phosphor of substantially the same size as the light source image (whose area is equal to or less than 1 square millimeter) of the semiconductor laser light source 73a projected by the condenser lens 73b is similar to the reason in the first aspect and therefore the explanation is omitted.

The laser optical system 73 includes the semiconductor laser light source 73a which is arranged between the projection lens 71 and the rear-side focus $F_{71}$ of the projection lens 71 and which is arranged above the optical axis AX1, and the condenser lens 73b arranged between the phosphor 72 and the semiconductor laser light source 73a, and so on. By this arrangement, it is possible to form the small light focusing unit 70 with a short optical-axis direction dimension. The semiconductor laser light source 73a and the condenser 73b may be unitized by being fixed to the laser holder.

Moreover, since the phosphor 72 is arranged apart from the semiconductor laser light source 73a, similar to the first aspect, it is possible to prevent or reduce the decrease of the efficiency of the phosphor 72 due to the influence of thermal energy generated from the semiconductor laser light source 73a.

The semiconductor laser light source 73*a* is a laser diode that emits blue laser light (wavelength: 450 [nm]), for example. The condenser lens 73*b* is subjected to position adjustment such that the area of the light source image of the semiconductor laser light source 73*a* projected to the phosphor 72 is equal to or less than 1 square millimeter, and is arranged between the phosphor 72 and the semiconductor laser light source 73*a*.

According to the light focusing unit 70 of the above-mentioned configuration, the laser light emitted from the laser light source 73*a* is focused by operation of the condenser lens 73*b* and irradiated to the phosphor 72. That is, the light source image of the semiconductor laser light source 73*a* is projected to the phosphor 72.

To improve the phototransformation efficiency of the phosphor 72, the incidence angle of (key light of) light from the laser optical system 73 with respect to the phosphor 72 is an angle between 30 degrees and 60 degrees (for example, 45 degrees). For example, this incidence angle can be adjusted within the above-mentioned angle range by adjusting the relative position relationships of the semiconductor laser light source 73*a*, the condenser lens 73*b* and the phosphor 72, and so on.

In the present aspect, it is assumed that the area of the light source image of the semiconductor laser light source 73*a* projected to the phosphor 72 is equal to or less than 1 square millimeter and has a shape (for example, oval, circular or rectangular light source image) that extends in the vehicle width direction (the direction orthogonal to the paper surface in FIG. 11). The oval or circular light source image can be formed by, for example, adjusting the focal position of the condenser lens 73*b*. The rectangular light source image can be formed by, for example, covering the light-emitting surface of the semiconductor laser light source 73*a* with a mask member in which a rectangular aperture is formed.

The phosphor 72 to which the laser light was irradiated emits white light (pseudo-white light) by the color mixture of the laser light (scattering light) from the laser optical system 73 which is scattered in the surface (and/or the inside) and the light from the phosphor 72 which is excited by the laser light entered from the laser optical system 73 and which emits the light. Since the area of the light source image of the semiconductor laser light source 73*a* projected to the phosphor 72 is equal to or less than 1 square millimeter, it is possible to make the phosphor 72 function as a light source which has higher luminance than an LED and which has the light-emitting size close to a point light source. For example, in a case where the current supplied to the semiconductor laser light source 73*a* is 1 [A], the luminance is 250 [cd/mm$^2$].

Thus, since it is possible to make the phosphor 72 function as a light source which has higher luminance than an LED and which has the light-emitting size close to a point light source, it is possible to miniaturize the light focusing unit 70 and therefore miniaturize the vehicle headlamp 10 including this.

The light emitted from the phosphor 72 that functions as a light source which has higher luminance than an LED and which has the light-emitting size close to a point light source is irradiated forward through the projection lens 71. In this way, the light-focus light-distribution pattern $P1_{LD}$ is formed, which irradiates the hot zone Hz in the low-beam light distribution pattern P1 that is a synthetic light distribution pattern, on a virtual vertical screen (which is arranged in, for example, a position about 25 m forward the vehicle front end) (see FIG. 3). The light-focus light-distribution pattern $P1_{LD}$ includes the cutoff line $CL1_{LD}$ defined by a light-blocking member 75 in the upper end edge. Here, the light focusing unit 70 is subjected to optical axis adjustment by a known aiming mechanism (not illustrated) such that the light-focus light-distribution pattern $P1_{LD}$ irradiates the hot zone Hz in the low-beam light distribution pattern P1 that is a synthetic light distribution pattern.

Even by the vehicle headlamp formed by combining the light focusing unit 70 of the present aspect and the diffusion unit 30 of the first aspect, it is possible to provide the same effect as the vehicle headlamp 10 of the first aspect.

Sixth Aspect

Next, the light focusing unit 80 that is the sixth aspect of the light focusing unit 20 is described.

Figure 12:
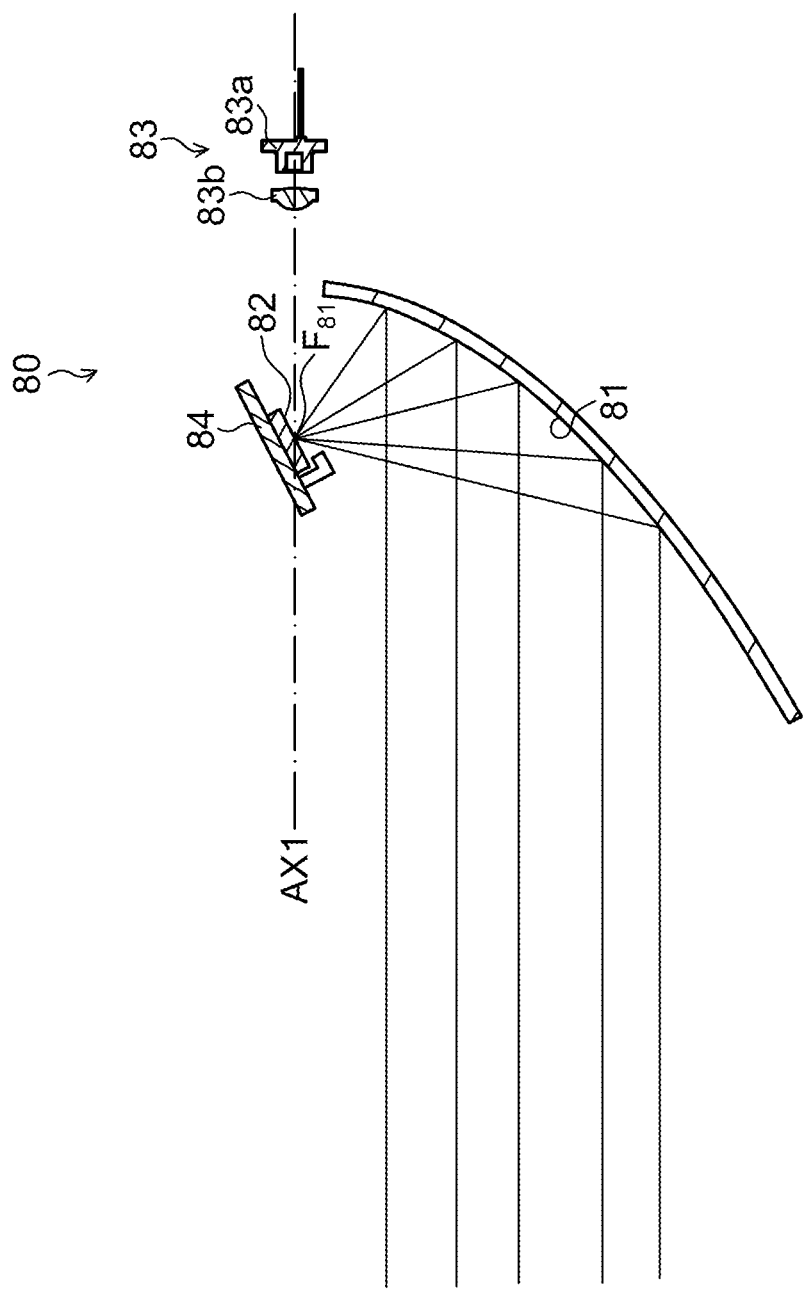
FIG. 12 is a longitudinal sectional view in which another exemplary light focusing unit is cut by a vertical surface including the optical axis AX1.

FIG. 12 is a longitudinal sectional view in which the light focusing unit 80 is cut by a vertical surface including the optical axis AX1.

The light focusing unit 80 of the present aspect is a lighting fixture unit of a so-called parabola type, and, as illustrated in FIG. 12, includes a reflecting surface 81 of a paraboloid system, a phosphor 82 arranged near a focus $F_{81}$ of the reflecting surface 81, and a laser optical system 83 that irradiates laser light to the phosphor 82, and so on. The reflecting surface 81 or the like corresponds to the first optical system of the disclosed subject matter.

The reflecting surface 81 is a paraboloid-system reflecting surface having the optical axis AX1 (rotation axis) that extends in the vehicle front-back direction, and is configured so as to reflect light that enters from the phosphor 82 and form the light-focus light-distribution pattern $P1_{LD}$ including the cutoff line $CL1_{LD}$.

The phosphor 82 is a wavelength conversion member (a YAG phosphor in the present aspect) that receives laser light from the laser optical system 83 and generates long-wavelength light from a semiconductor laser light source 83*a*. The phosphor 82 is attached to a metallic member 84 to which mirror processing such as aluminum evaporation is applied, and arranged near the rear-side focus $F_{71}$ of the projection lens 71. Here, the phosphor 82 is inclined and arranged such that the vehicle front side is positioned downward.

The phosphor 82 emits white light (pseudo-white light) by the color mixture of the laser light (scattering light) from the laser optical system 83 which is scattered in the surface (and/or the inside) and the light from the phosphor 82 which is excited by the laser light entered from the laser optical system 83 and which emits the light.

In the light isotropically emitted from the phosphor 82, the light toward the side of the metallic member 84 is reflected in the metallic member 84 and goes toward the reflecting surface 81. That is, since it is possible to reuse the light toward the side of the metallic member 84, the light use efficiency further improves.

In the present aspect, as the phosphor 82, a phosphor having a shape which extends in the vehicle width direction (the direction orthogonal to a paper surface in FIG. 12) and which has substantially the same size (for example, a slightly larger size than a light source image of the semiconductor laser light source 83*a*) as a light source image (whose area is equal to or less than 1 square millimeter) of the semiconductor laser light source 83*a* projected by a condenser lens 83*b*, is used.

Here, the reason for using a phosphor of substantially the same size as the light source image (whose area is equal to or less than 1 square millimeter) of the semiconductor laser light source 83*a* projected by the condenser lens 83*b* is similar to the reason in the first aspect and therefore the explanation is omitted.

The laser optical system 83 includes the semiconductor laser light source 83*a* arranged on the vehicle rear side of the phosphor 82 on the optical axis AX1 and a condenser lens 83*b* arranged between the phosphor 82 and the semiconductor laser light source 83a, and so on. The semiconductor laser light source 83a and the condenser 83b may be unitized by being fixed to the laser holder.

Moreover, since the phosphor 82 is arranged apart from the semiconductor laser light source 83a, similar to the first aspect, it is possible to prevent or reduce the decrease of the efficiency of the phosphor 82 due to the influence of thermal energy generated from the semiconductor laser light source 83a.

The semiconductor laser light source 83a is a laser diode that emits blue laser light (wavelength: 450 [nm]), for example. The condenser lens 83b is subjected to position adjustment such that the area of the light source image of the semiconductor laser light source 83a projected to the phosphor 82 is equal to or less than 1 square millimeter, and is arranged between the phosphor 82 and the semiconductor laser light source 83a.

According to the light focusing unit 80 of the above-mentioned configuration, the laser light emitted from the laser light source 83a is focused by operation of the condenser lens 83b and irradiated to the phosphor 82. That is, the light source image of the semiconductor laser light source 83a is projected to the phosphor 82.

To improve the phototransformation efficiency of the phosphor 82, the incidence angle of (key light of) light from the laser optical system 83 with respect to the phosphor 82 is an angle between 30 degrees and 60 degrees (for example, 45 degrees). For example, this incidence angle can be adjusted within the above-mentioned angle range by adjusting the relative position relationships of the semiconductor laser light source 83a, the condenser lens 83b and the phosphor 82, and so on.

In the present aspect, it is assumed that the area of the light source image of the semiconductor laser light source 83a projected to the phosphor 82 is equal to or less than 1 square millimeter and has a shape (for example, oval, circular or rectangular light source image) that extends in the vehicle width direction (the direction orthogonal to the paper surface in FIG. 12). The oval or circular light source image can be formed by, for example, adjusting the focal position of the condenser lens 83b. The rectangular light source image can be formed by, for example, covering the light-emitting surface of the semiconductor laser light source 83a with a mask member in which a rectangular aperture is formed.

The phosphor 82 to which the laser light was irradiated emits white light (pseudo-white light) by the color mixture of the laser light (scattering light) from the laser optical system 83 which is scattered in the surface (and/or the inside) and the light from the phosphor 82 which is excited by the laser light entered from the laser optical system 83 and which emits the light. Since the area of the light source image of the semiconductor laser light source 83a projected to the phosphor 82 is equal to or less than 1 square millimeter, it is possible to make the phosphor 82 function as a light source which has higher luminance than an LED and which has the light-emitting size close to a point light source. For example, in a case where the current supplied to the semiconductor laser light source 83a is 1 [A], the luminance is 250 [cd/mm$^2$].

Thus, since it is possible to make the phosphor 82 function as a light source which has higher luminance than an LED and which has the light-emitting size close to a point light source, it is possible to miniaturize the light focusing unit 80 and therefore miniaturize the vehicle headlamp 10 including this.

The light, which is emitted from the phosphor 82 that functions as a light source having higher luminance than an LED and the light-emitting size close to a point light source and which enters the reflecting surface 81, is reflected on the reflecting surface 81 and irradiated forward. In this way, the light-focus light-distribution pattern $P1_{LD}$ is formed, which irradiates the hot zone Hz in the low-beam light distribution pattern P1 that is a synthetic light distribution pattern, on a virtual vertical screen (which is arranged in, for example, a position about 25 m forward the vehicle front end portion) (see FIG. 3). The light-focus light-distribution pattern $P1_{LD}$ includes the cutoff line $CL1_{LD}$ in the upper end edge. Here, the light focusing unit 80 is subjected to optical axis adjustment by a known aiming mechanism (not illustrated) such that the light-focus light-distribution pattern $P1_{LD}$ irradiates the hot zone Hz in the low-beam light distribution pattern P1 that is a synthetic light distribution pattern.

Even by the vehicle headlamp formed by combining the light focusing unit 80 of the present aspect and the diffusion unit 30 of the first aspect, it is possible to provide the same effect as the vehicle headlamp 10 of the first aspect.

Although examples to form a vehicle headlamp by combining any one of totally six kinds of the light focusing units 20 and 40 to 80 and the diffusion unit 30 of the first aspect have been described above, the disclosed subject matter is not limited to this. For example, the vehicle headlamp may be formed by combining multiple items of totally six kinds of the light focusing units 20 and 40 to 80 and the diffusion unit 30 of the first aspect. That is, it is possible to form the vehicle headlamp by combining the diffusion unit 30 of the first aspect and the light focusing units 20 and 40 to 80 adequately selected according to a requested design, and so on.

The above-mentioned aspects are mere exemplifications in all respects. The disclosed subject matter is not limitedly interpreted by these descriptions. The disclosed subject matter can be implemented in other various ways without departing from the spirit or main feature.

The invention claimed is:

1. A vehicle headlamp that forms a synthetic light distribution pattern including a hot zone and a diffusion region diffused from the hot zone, the vehicle headlamp comprising:
at least one first lighting fixture unit including a laser light source and a first optical system that forms a first light distribution pattern to irradiate light forward from the laser light source and irradiate the hot zone; and
at least one second lighting fixture unit including an LED light source and a second optical system that forms a second light distribution pattern to irradiate light forward from the LED light source and irradiate the diffusion region,
wherein the laser light source comprises: a semiconductor laser light source; and a wavelength conversion member that is arranged apart from the semiconductor laser light source, and receives laser light from the semiconductor laser light source and generates light of a longer wavelength than a wavelength of the light from the semiconductor laser light source,
wherein the first optical system comprises: a projection lens arranged on an optical axis that extends in a vehicle front-back direction; the wavelength conversion member which is arranged on a vehicle rear side with respect to the projection lens; and a reflecting surface that reflects light from the wavelength conversion member so as to be focused near the optical axis,
wherein the reflecting surface is arranged to cover an upper side of the wavelength conversion member, a cross-sectional shape thereof including the optical axis is set to an elliptical shape, and an eccentricity thereof is set to increase from a vertical cross-section to a horizontal cross-section, and the light from the wavelength conversion member which is reflected by the reflecting surface is focused between the wavelength conversion member and the projection lens, wherein the focused light is focused near a rear-side focus of the projection lens in a vertical cross-section including the optical axis and focused in a forward side with respect to the vertical cross-section in a horizontal cross-section including the optical axis, wherein the wavelength conversion member is a composite of a phosphor and a ceramic material, and the wavelength conversion member is held by a holder made of a metallic material and is arranged below the reflecting surface, wherein the holder has a cylindrical shape, and an aperture formed in an end of the holder is covered by the wavelength conversion member, wherein the wavelength conversion member is a mixed light of a light from the wavelength conversion member which is excited by the laser light from the semiconductor laser light source and a light which penetrates the wavelength conversion member, and wherein a light source image of the semiconductor laser light source projected to the wavelength conversion member has higher luminance than the LED light source and has a smaller size than the LED light source.

2. The vehicle headlamp according to claim 1,
wherein a spectrum of the light from the first lighting fixture unit includes a spectrum of the light emitted from the laser light source and a spectrum of the light from the wavelength conversion member of 500 nm to 700 nm,
wherein a spectrum of the light from the second lighting fixture unit includes the spectrum of the light emitted from the laser light source to 500 nm,
wherein the light from the first lighting fixture unit and the light from the second lighting fixture unit are added to be emitted to a vehicle front.

3. The vehicle headlamp according to claim 1,
wherein the holder is integrally formed with a shade.

4. The vehicle headlamp according to claim 1,
wherein the semiconductor laser light source is fixed to a cylindrical portion of the holder.

5. The vehicle headlamp according to claim 1,
wherein an area of a light source image of the semiconductor laser light source irradiated to the wavelength conversion member is equal to or less than 1 square millimeter, and the wavelength conversion member has a same size as the light source image of the semiconductor laser light source.

6. A vehicle headlamp that forms a synthetic light distribution pattern including a hot zone and a diffusion region diffused from the hot zone, the vehicle headlamp comprising:
at least one first lighting fixture unit including a laser light source and a first optical system that forms a first light distribution pattern to irradiate light forward from the laser light source and irradiate the hot zone; and
at least one second lighting fixture unit including an LED light source and a second optical system that forms a second light distribution pattern to irradiate light forward from the LED light source and irradiate the diffusion region,
wherein the laser light source comprises: a semiconductor laser light source; and a wavelength conversion member that is arranged apart from the semiconductor laser light source, and receives laser light from the semiconductor laser light source and generates light of a longer wavelength than a wavelength of the light from the semiconductor laser light source,
wherein an area of a light source image of the semiconductor laser light source irradiated to the wavelength conversion member is equal to or less than 1 square millimeter, and the wavelength conversion member has a same size as the light source image of the semiconductor laser light source.

* * * * *